United States Patent
Gädt et al.

(10) Patent No.: US 11,377,392 B2
(45) Date of Patent: Jul. 5, 2022

(54) ADDITIVE FOR HYDRAULICALLY SETTING COMPOSITIONS

(71) Applicant: Construction Research & Technology, GmbH, Trostberg (DE)

(72) Inventors: Torben Gädt, Traunstein (DE); Harald Grassl, Feichten (DE); Luc Nicoleau, Villevaude (FR); Alfons Smeets, Seebruck (DE)

(73) Assignee: Construction Research & Technology GmbH, Trostberg (DE)

( * ) Notice: Subject to any disclaimer, the term of this patent is extended or adjusted under 35 U.S.C. 154(b) by 445 days.

(21) Appl. No.: 15/735,829

(22) PCT Filed: Jun. 27, 2016

(86) PCT No.: PCT/EP2016/064815
§ 371 (c)(1),
(2) Date: Dec. 12, 2017

(87) PCT Pub. No.: WO2016/207429
PCT Pub. Date: Dec. 29, 2016

(65) Prior Publication Data
US 2020/0055784 A1    Feb. 20, 2020

(30) Foreign Application Priority Data
Jun. 26, 2015    (EP) ..................... 15173980

(51) Int. Cl.
| | |
|---|---|
| *C04B 40/00* | (2006.01) |
| *C04B 24/00* | (2006.01) |
| *C04B 24/26* | (2006.01) |
| *C04B 28/04* | (2006.01) |
| *C08F 290/06* | (2006.01) |
| *C04B 28/06* | (2006.01) |
| *C04B 28/00* | (2006.01) |
| *C04B 28/02* | (2006.01) |
| *C04B 28/08* | (2006.01) |
| *C04B 22/08* | (2006.01) |
| *C04B 22/16* | (2006.01) |
| *C04B 103/30* | (2006.01) |
| *C04B 103/40* | (2006.01) |
| *C04B 103/14* | (2006.01) |

(52) U.S. Cl.
CPC .......... *C04B 40/0039* (2013.01); *C04B 22/08* (2013.01); *C04B 22/16* (2013.01); *C04B 24/00* (2013.01); *C04B 24/003* (2013.01); *C04B 24/2647* (2013.01); *C04B 24/2694* (2013.01); *C04B 28/001* (2013.01); *C04B 28/02* (2013.01); *C04B 28/021* (2013.01); *C04B 28/026* (2013.01); *C04B 28/04* (2013.01); *C04B 28/06* (2013.01); *C04B 28/08* (2013.01); *C04B 40/00* (2013.01); *C04B 40/0042* (2013.01); *C08F 290/062* (2013.01); *C04B 2103/14* (2013.01); *C04B 2103/308* (2013.01); *C04B 2103/408* (2013.01); *Y02W 30/91* (2015.05)

(58) Field of Classification Search
CPC ............ C04B 40/0039; C04B 24/2694; C04B 24/003; C04B 24/2647; C04B 28/04; C04B 2103/308; C04B 2103/408; C04B 28/06; C04B 40/0042; C04B 2103/14; C04B 28/001; C04B 28/0021; C04B 28/02; C04B 28/021; C04B 28/026; C04B 28/08; C04B 22/08; C04B 22/16; C04B 24/00; C04B 40/00; C08F 290/062; Y02W 30/92; Y02W 30/94; Y02W 30/91
See application file for complete search history.

(56) References Cited

U.S. PATENT DOCUMENTS

| | | | |
|---|---|---|---|
| 5,263,542 A * | 11/1993 | Brothers | ................. C04B 7/527 |
| | | | 106/714 |
| 5,798,425 A | 8/1998 | Albrecht et al. | |
| 6,187,841 B1 | 2/2001 | Tanaka et al. | |
| 6,211,317 B1 | 4/2001 | Albrecht et al. | |
| 6,376,581 B1 | 4/2002 | Tanaka et al. | |
| 6,730,162 B1 | 5/2004 | Li et al. | |
| 6,762,220 B1 | 7/2004 | Yaguchi et al. | |
| 6,777,517 B1 | 8/2004 | Albrecht et al. | |
| 7,026,402 B2 | 4/2006 | Schober et al. | |
| 7,056,964 B2 | 6/2006 | Lettkeman et al. | |

(Continued)

FOREIGN PATENT DOCUMENTS

| | | |
|---|---|---|
| DE | 10 2004 050 395 A1 | 4/2006 |
| EP | 0 753 488 A2 | 1/1997 |

(Continued)

OTHER PUBLICATIONS

Machine English Translation of EP 2687498, Construction Research & Technology GMBH, Jan. 2014.*
PCT/EP2016/064815—International Search Report, dated Aug. 19, 2016.
PCT/EP2016/064815—International Written Opinion, dated Aug. 19, 2016.
PCT/EP2016/064815—International Preliminary Report on Patentability, dated Dec. 26, 2017.
European Search Report—EP 15 17 3980 Search Report, dated Dec. 10, 2015.

(Continued)

*Primary Examiner* — Patrick D Niland
(74) *Attorney, Agent, or Firm* — Curatolo Sidoti & Trillis Co., LPA; Salvatore A Sidoti; Floyd Trillis, III

(57) ABSTRACT

The present invention relates to an additive for hydraulically setting compositions comprising a colloidally disperse preparation comprising at least one salt of a polyvalent metal cation with at least one organic phosphonate and/or phosphate compound as anion and at least one polymeric dispersant comprising anionic and/or anionogenic groups and polyether side chains. The additive is especially suitable as slump retainer and for improving early strength.

19 Claims, No Drawings

(56) References Cited

U.S. PATENT DOCUMENTS

| | | | |
|---|---|---|---|
| 7,338,990 | B2 | 3/2008 | Lettkeman et al. |
| 7,375,163 | B2 | 5/2008 | Schober et al. |
| 7,842,766 | B2 | 11/2010 | Kraus et al. |
| 7,879,146 | B2 | 2/2011 | Raki et al. |
| 7,910,640 | B2 | 3/2011 | Wieland et al. |
| 8,653,186 | B2 * | 2/2014 | Nicoleau ............ C04B 40/0042 524/791 |
| 9,315,419 | B2 | 4/2016 | Gädt et al. |
| 9,777,133 | B2 | 10/2017 | Gädt et al. |
| 9,796,628 | B2 | 10/2017 | Gädt et al. |
| 2002/0001721 | A1 | 1/2002 | Barriere et al. |
| 2002/0007019 | A1 | 1/2002 | Schober et al. |
| 2004/0127607 | A1 | 7/2004 | Schober et al. |
| 2005/0250888 | A1 | 11/2005 | Lettkeman et al. |
| 2007/0022916 | A1 | 2/2007 | Raki et al. |
| 2007/0032599 | A1 | 2/2007 | Schober et al. |
| 2008/0108732 | A1 | 5/2008 | Wieland et al. |
| 2008/0146700 | A1 | 6/2008 | Kraus et al. |
| 2008/0214737 | A1 * | 9/2008 | Nied .................. C02F 1/68 525/221 |
| 2011/0083586 | A1 | 4/2011 | Raki et al. |
| 2011/0166261 | A1 | 7/2011 | Lorenz et al. |
| 2011/0269875 | A1 | 11/2011 | Nicoleau et al. |
| 2012/0035301 | A1 | 2/2012 | Vierle et al. |
| 2012/0046392 | A9 | 2/2012 | Lorenz et al. |
| 2012/0046393 | A1 | 2/2012 | Cha et al. |
| 2013/0217808 | A1 | 8/2013 | Sulser et al. |
| 2015/0158768 | A1 | 6/2015 | Gädt et al. |
| 2016/0002435 | A1 | 1/2016 | Gädt et al. |
| 2017/0073267 | A1 | 3/2017 | Gallucci et al. |

FOREIGN PATENT DOCUMENTS

| | | |
|---|---|---|
| EP | 0 894 811 A1 | 2/1999 |
| EP | 1 136 508 A1 | 9/2001 |
| EP | 1 138 698 A1 | 10/2001 |
| EP | 2 412 689 A2 | 2/2012 |
| EP | 2 463 314 A1 | 6/2012 |
| EP | 2 687 498 A1 | 1/2014 |
| EP | 2 769 964 A1 | 8/2014 |
| JP | S 57-67057 A | 4/1982 |
| WF | 0 537 870 A1 | 4/1993 |
| WO | WO 00/48961 | 8/2000 |
| WO | WO 00/77058 A1 | 12/2000 |
| WO | WO 02/49983 A1 | 6/2002 |
| WO | WO 2006/042709 A1 | 4/2006 |
| WO | WO 2006/089759 A1 | 8/2006 |
| WO | WO 2006/133933 A2 | 12/2006 |
| WO | WO 2009/004348 A2 | 1/2009 |
| WO | WO 2010/026155 A1 | 3/2010 |
| WO | WO 2010/029117 A1 | 3/2010 |
| WO | WO 2010/066470 A1 | 6/2010 |
| WO | WO 2014/013077 A1 | 1/2014 |
| WO | WO 2014/131778 A1 | 9/2014 |
| WO | WO 2015/177232 A1 | 11/2015 |

OTHER PUBLICATIONS

J. Plank, et al., "Experimental Determination of the Effective Anionic Charge Density of Polycarboxylate Superplasticizers in Cement Pore Solution", Cement and Concrete Research, Jan. 2009, pp. 1-5, vol. 39, Issue 1.

* cited by examiner

ADDITIVE FOR HYDRAULICALLY SETTING COMPOSITIONS

CROSS REFERENCE TO RELATED APPLICATIONS

This application is a national stage application of International Application No. PCT/EP2016/064815, filed 27 Jun. 2016, which claims priority from European Patent Application No. 15173980.2, filed 26 Jun. 2015, which applications are incorporated herein by reference.

The invention relates to an additive for hydraulically setting compositions which is suitable more particularly as a slump retainer.

Hydraulically setting compositions which comprise aqueous slurries of hydraulic and/or mineral binder with pulverulent inorganic and/or organic substances, such as clays, finely ground silicates, chalks, carbon blacks, or finely ground minerals, find broad application for example in the form of concretes, mortars or plasters.

It is known that hydraulically setting compositions are admixed, for the purpose of improving their processing properties—that is, kneadability, spreadability, sprayability, pumpability or fluidity—with additives which comprise polymeric dispersants. Additives of this kind are able to prevent the formation of agglomerates of solids, to disperse existing particles and those newly formed by hydration, and in this way to improve the processing properties. Additives which comprise polymeric dispersants are also particularly used specifically in the preparation of hydraulically setting compositions which comprise hydraulic and/or mineral binders such as (portland) cement, slag sand, fly ash, silica dust, metakaolin, natural pozzolans, burnt oil shale, calcium aluminate cement, lime, gypsum, hemihydrate, anhydrite or mixtures of two or more of these components.

In order to bring these hydraulically setting compositions, based on the stated binders, into a ready-to-use, processible form, it is generally necessary to use substantially more mixing water than would be needed for the subsequent hardening process. In the concrete structure, the cavities that are formed by the excess water, which subsequently evaporates, reduce mechanical strength and resistance.

In order to reduce the fraction of excess water for a given processing consistency, and/or to improve the processing properties for a given water/binder ratio, additives are used which are identified generally as water reducers or plasticizers. Water reducers or plasticizers used in practice are more particularly polymers which are obtained by radical polymerization and are based on carboxyl-containing monomers and on polyethylene glycol-containing olefinic monomers, these polymers also being referred to as polycarboxylate ethers (abbreviated to "PCEs"). These polymers have a carboxyl-containing main chain with polyethylene glycol-containing side chains, and are also identified as comb polymers.

A separate category from the water reducers and plasticizers, which bring about plasticization of freshly mixed concrete in relatively low dosage, is that of the consistency agents or slump-maintaining additives, referred to below as "slump retainers", which achieve the same initial plasticization, only in relatively high dosage, but bring about a constant slump flow spread over time. In contrast to the addition of water reducers, the addition of slump retainers allows good processing properties to be extended for up to, for example, 90 minutes after the mixing of the concrete, whereas with water reducers the processing properties deteriorate significantly after usually just 10 to 30 minutes.

A characteristic of the comb polymers known to date in the prior art is that depending on certain polymer-specific parameters it is possible deliberately to produce a water reducer or else a slump retainer. These polymer-specific parameters include the number of carboxyl groups or other acid groups, the number and length of the polyethylene glycol side chains, and the molecular weight. An adjustment between water reduction effect and slump retention effect through a corresponding selection of aforementioned polymer-specific parameters is nevertheless possible only a priori by means of synthetic or polymerization measures in the laboratory or in a chemical production plant. In these cases, corresponding types of acid monomers and polyethylene glycol-containing macromonomers are usually selected and polymerized in certain molar ratios. As a result of the stipulation made in the production process, the conversion of a water reducer into a slump retainer, or vice versa, at the site of the concrete processing is not possible according to the prior art.

In the art, generally speaking, water reducers and slump retainers are used in varying proportions in formulations. By means of formulating measures, however, the possibilities of improving slump retention are only very limited, it being difficult in particular to improve slump retention without at the same time adversely affecting other properties of the concrete. For instance, a formulation with slump retainers does result in better slump retention, as disclosed for example in WO 2009/004348 in connection with phosphonates and in JP 57067057A in connection with sugars. However, the retention of slump is gained only at the expense of poorer early strengths.

Other Methods for Retaining Slump in a Cementitious Binder Dispersion have been Disclosed in the Prior Art Over Time:

The use of high-performance plasticizers based on polycarboxylate ether with hydrolysable acrylic esters, known as "dynamic superplasticizers", as described in EP 1 136 508 A1 and WO 2010/029117. This technology allows the time-controlled adsorption of plasticizer polymers on to the surfaces of the cement particles, the retention of the slump being improved by hydrolysis of corresponding carboxylic acid derivatives (e.g. acrylic esters) in the alkaline concrete medium. The "dynamic superplasticizer" properties as well are laid down by synthetic or polymerization measures within the laboratory or in a chemical production plant, and cannot be adjusted flexibly at the site of the concrete processing.

Furthermore, use is made of crosslinked polycarboxylate ethers which are crosslinked by monomers having more than one polymerizable function, such as di(meth)acrylates, for example. Under the strongly basic conditions of the cementitious pore water, the crosslinking structural units undergo hydrolysis, crosslinking is halted, and the non-crosslinked (co)polymer, which is active as a plasticizer, is released over time (WO2000/048961). The properties of these crosslinked polycarboxylate ethers as well are laid down by synthetic or polymerization measures in the laboratory or in a chemical production plant, and cannot be adjusted flexibly at the site of the concrete processing. Moreover, there is the risk of unintended premature hydrolysis during the storage of the products. For this reason, formulation and storage with other basic additions having pH values>8 is often impossible.

U.S. Pat. No. 7,879,146 B2 discloses the preparation of double layer hydroxides based on divalent metal cations (e.g. $Ni^{2+}$, $Zn^{2+}$, $Mn^{2+}$ and/or $Ca^{2+}$) and trivalent metal cations (e.g. $Al^{3+}$, $Ga^{3+}$, $Fe^{3+}$ and/or $Cr^{3+}$). The double layer hydroxides are able to intercalate anions such as nitrates, hydroxides, carbonates, sulphates and chlorides. The inorganic products are treated at elevated temperature (65° C.) for a number of hours and then dried under reduced pressure at 100° C. In a subsequent ion exchange operation, organic molecules are intercalated into the thus-prepared double layer hydroxides, examples of such molecules being naphthalenesulphonates, derivatives of nitrobenzoic acid, salicylic acid, citric acid, polyacrylic acids, polyvinyl alcohol and a superplasticizer based on a sodium salt of polynaphthalenesulphonic acid (PNS). The polynaphthalenesulphonic acid (PNS) sodium salts modified inorganically by double layer hydroxides bring about only a slight improvement in slump retention in a mortar test. For many applications, this improvement is not sufficient.

EP 2 412 689 describes a nano-hybrid additive for concrete, composed of a layered double hydroxide and a polyurethane copolymer, the additive being prepared by mixing the two components and by hydrothermal treatment. The additive is said to prevent the breakdown of underwater concrete induced by chloride ions and to prevent the decomposition of concrete as a result of the use of deicing agents, such as calcium chloride, in winter. Disadvantageous are the long synthesis times of >6 h and the required high temperatures of 80 to 100° C. for the hydrothermal preparation of the double layer hydroxides. Furthermore, with this method as well, the properties of the hybrid are necessarily laid down in a complicated synthesis procedure in a chemical production plant.

WO/2014/013077 and WO 2014/131778 describe additives for hydraulically setting compositions which are suitable as consistency agents which contain aqueous colloidally disperse preparations of a salt of polyvalent cations, for example iron, calcium, aluminium, and inorganic anions, for example phosphate, aluminate and borate. However, it would be desirable to have even more effective additives.

WO 2015/177232 discloses accelerators for hydraulic binding agents with long processing time and very high early strength which comprises at least one ester of phosphoric acid with a polyvalent alcohol, such as glycerol, and at least one calcium compound. However, the amount of calcium ion as calculated using formula (a) below is significantly above 50.

The diverse requirements imposed on the performance profile of concretes are subject to nationally specific regulations and standardizations, and are heavily dependent on the conditions prevailing at the particular building site, such as the weathering conditions for instance. Slump retention in particular is heavily dependent on the conditions prevailing at the particular construction site.

Since the weathering conditions prevailing may be very different from one construction site to another, there is a need within the construction industry to eliminate the above-described deficiencies of the prior art. The invention is therefore based on the problem of providing efficient slump retainers. These slump retainers ought to be able to ensure sufficient slump retention under the conditions prevailing on the construction site, without adversely affecting other concrete properties, such as the early strength for example.

This Problem is Solved by the Following Embodiments

1. Additive for hydraulically setting compositions, comprising an aqueous colloidally disperse preparation comprising
a) at least one salt of at least one polyvalent metal cation with at least one organic phosphonate and/or organic phosphate compound as anion, optionally in a mixture with at least one compound capable of releasing an inorganic anion selected from carbonate, oxalate, silicate, phosphate, polyphosphate, phosphite, borate, aluminate and sulphate, which forms a sparingly soluble salt with the polyvalent metal cation and
b) at least one polymeric dispersant comprising anionic and/or anionogenic groups and polyether side chains, wherein the polyvalent metal cation is selected from $Al^{3+}$, $Fe^{3+}$, $Fe^{2+}$, $Zn^{2+}$, $Mn^{2+}$, $Cu^{2+}$, $Ca^{2+}$, $Mg^{2+}$, $Sr^{2+}$, $Ba^{2+}$ and mixtures thereof, and the polyvalent metal cation is present in an amount corresponding to the following formula (a):

$$0.1 < \frac{\sum_i z_{K,i} * n_{K,i}}{\sum_j z_{S,j} * n_{S,j}} < 50 \tag{a}$$

where $z_{K,i}$ is the magnitude of the charge of the polyvalent metal cation, $n_{K,i}$ is the number of moles of the polyvalent metal cation weighed in, $z_{S,j}$ is the magnitude of the charge of the anionic and anionogenic group present in the polymeric dispersant, $n_{S,j}$ is the number of moles of the anionic and anionogenic group present in the polymeric dispersant weighed in, the indices i and j are independent of one another and are an integer greater than 0, where i is the number of different kinds of polyvalent metal cations and j is the number of different kinds of anionic and anionogenic groups present in the polymeric dispersant, where $z_K,i$ is defined such that the charge for cations is always based on the full formal charge, i.e. $z_{Fe}(Fe^{3+})=3$, $z_{Fe}(Fe^{2+})=2$. $z_{S,j}$ is the magnitude of the formal charge of the anions with maximum deprotonation, i.e. $z_{COO^-}=1$; $z_{-O-PO3}{}^{2-}=2$; $z_{-PO3}{}^{2-}=2$ or $z_{PO4}(H_3\text{-}PO_4)=z_{PO4}(Na_3PO_4)=3$, or $z_{CO3}(Na_2CO_3)=2$. In the case of aluminate, the value is set at $z_{AlO2}(NaAlO_2)=z_{AlO2}(NaAl(OH)_4)=1$; in the case of silicate, the value for all silicate species is set at $z_{SiO3}(Na_2SiO_3)=2$.

2. Additive according to Embodiment 1, wherein the polyvalent metal cation is selected from $Al^{3+}$, $Fe^{3+}$, $Fe^{2+}$, $Mn^{2+}$, $Zn^{2+}$, $Ca^{2+}$ and mixtures thereof.

3. Additive according to Embodiment 1, wherein the polyvalent metal cation is selected from $Al^{3+}$, $Fe^{3+}$, $Fe^{2+}$, $Ca^{2+}$ and mixtures thereof.

4. Additive according to Embodiment 1, wherein the polyvalent metal cation is $Ca^{2+}$.

5. Additive according to any of the preceding embodiments, wherein the organic phosphonate or phosphate compound is capable of forming a sparingly soluble salt with the polyvalent metal cation.

6. Additive according to any of the preceding embodiments, wherein the ratio according to formula (a) is in the range from ≥0.5 to ≤40, preferably ≥1 to 40, especially 1 to 30.

7. Additive according to Embodiment 6, wherein the ratio according to formula (a) is in the range from 1 to 8 or 1.1 to 8, preferably 1 to 6 or 1.1 to 6 or 1.2 to 6.

8. Additive according to either of Embodiments 6 and 7, wherein the ratio according to formula (a) is in the range from 1 to 5 or 1.1 to 5 or 1.2 to 5 or 1.25 to 5.

9. Additive according to any of the preceding embodiments, wherein the polyvalent metal cation is present in an amount corresponding to the following formula (a) and the anion in an amount corresponding to the following formula (b):

$$0.1 < \frac{\sum_i z_{K,i} * n_{K,i}}{\sum_j z_{S,j} * n_{S,j}} < 50 \quad (a)$$

$$0 < \frac{\sum_l z_{A,l} * n_{A,l}}{\sum_i z_{K,i} * n_{K,i}} < 3 \quad (b)$$

where $z_{K,i}$ is the magnitude of the charge of the polyvalent metal cation, $n_{K,i}$ is the number of moles of the polyvalent metal cation weighed in, $z_{S,j}$ is the charge of the anionic and anionogenic groups present in the polymeric dispersant, $n_{S,j}$ is the number of moles of the anionic and anionogenic groups present in the polymeric dispersant weighed in, $z_{A,l}$ is the charge of the anion weighed in, $n_{A,l}$ is the number of moles of the anion weighed in, the indices i, j and l are independent of one another and are an integer greater than 0, i is the number of different kinds of polyvalent metal cations and j is the number of different kinds of anionic and anionogenic groups present in the polymeric dispersant, l is the number of different kinds of anions which can form a sparingly soluble salt with the metal cation, where the charge $z_{A,j}$ is defined analogously to $z_{S,j}$ above, i.e. $z_{PO4}$(phenoxyethanolphosphate)=$z_{PO3}$(vinylphosphonate)=2, where any inorganic ions that are optionally added are also entered into the formula (b).

10. Additive according to Embodiment 9, wherein the ratio according to formula (b) is selected from one of the following ranges:

>0 to ≤3;
0.01 to 2;
0.1 to 2;
0.1 to 1;
0.2 to 1.5;
0.2 to 1 and
0.2 to 0.75.

11. Additive according to any of the preceding embodiments, wherein the anion is selected from organic phosphonates or phosphates having 1 to 3 phosphonic acid and/or 1 to 3 phosphoric acid groups.

12. Additive according to Embodiment 11, wherein the anion is derived from an organic phosphoric acid or phosphonic acid of the formula I $R^A$—$R^B$—$R^C$ in which $R^A$ is H, hydroxyl, $C_1$-$C_4$-alkoxy, $C_1$-$C_4$-alkyl, phenyl, —$PO_3H_2$ or —$OPO_3H_2$;

$R^B$ is $C_1$-$C_4$-alkylene optionally substituted by hydroxyl, $C_2$-$C_4$-alkenylene, —$(CH_2)_x$—$NR^D$—$(CH_2)_y$— or —$(OC_zH_z)_n$—;

$R^C$ is —$PO_3H_2$ or —$OPO_3H_2$;

$R^D$ is —$(CH_2)_x$—$R^C$, hydroxy-$C_1$-$C_4$-alkyl or $R^E$—$(OC_zH_z)_n$—;

$R^E$ is H or $C_1$-$C_4$-alkyl;

x is 1 or 2;

y is 1 or 2;

z is 1, 2, 3 or 4; and n is 1 to 100; and mixtures thereof.

The expression "derived" here and hereinafter means that the anion is the negatively charged radical of the organic phosphoric acid or phosphonic acid which is formed by removal of an H⁺ ion from the —$PO_3H_2$ or —$OPO_3H_2$ group.

13. Additive according to Embodiment 12, wherein the anion is derived from an organic phosphoric acid or phosphonic acid of the formula I in which $R^A$ is H, phenyl, —$PO_3H_2$ or —$OPO_3H_2$;

$R^B$ is $C_1$-$C_4$-alkylene substituted by hydroxyl, $C_2$-alkenylene, —$(CH_2)_x$—$NR^D$—$(CH_2)_y$ or —$(OC_zH_z)_n$—;

$R^C$ is —$PO_3H_2$ or —$OPO_3H_2$;

$R^D$ is —$(CH_2)_x$—$R^C$, hydroxy-$C_1$-$C_4$-alkyl or $R^E$—$(OC_zH_z)_n$—;

$R^E$ is H or $C_1$-$C_4$-alkyl;

x is 1;

y is 1;

z is 2 or 3; and n is 1 to 100; and mixtures thereof.

14. Additive according to Embodiment 12 or 13, wherein the anion is derived from an organic phosphoric acid or phosphonic acid of the formula I in which $R^A$ is phenyl, —$PO_3H_2$ or —$OPO_3H_2$;

$R^B$ is $C_1$-$C_4$-alkylene substituted by hydroxyl or —$(OC_zH_z)_n$—;

$R^C$ is —$PO_3H_2$ or —$OPO_3H_2$;

z is 2 or 3; and n is 1 to 100; and mixtures thereof.

15. Additive according to any of the preceding embodiments, wherein the anion is derived from an organic phosphoric acid or phosphonic acid of the formula

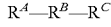

HEDP

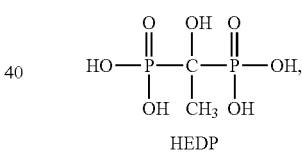

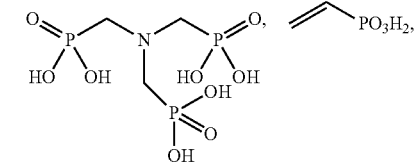

PEP with n = 1-100

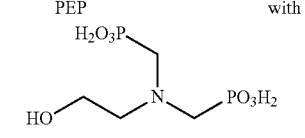

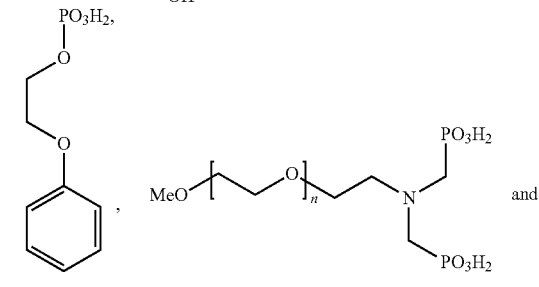

or mixtures thereof.

16. Additive according to any of the preceding embodiments, wherein the anion is derived from an organic phosphoric acid or phosphonic acid of the formula

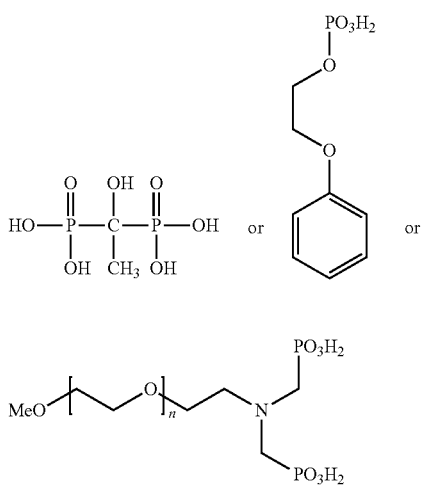 or 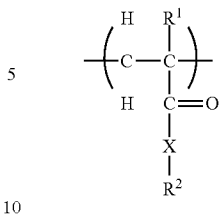 or

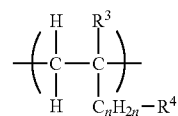

with n=1-100 or
a mixture thereof.

17. Additive according to any of the preceding embodiments, additionally comprising at least one neutralizing agent.

18. Additive according to Embodiment 17, wherein the neutralizing agent is an organic aliphatic monoamine, aliphatic polyamine, alkali metal hydroxide, especially sodium or potassium hydroxide, or ammonia.

19. Additive according to Embodiment 18, wherein the neutralizing agent is selected from ammonia, monohydroxy-$C_1$-$C_4$-alkylamines, dihydroxy-$C_1$-$C_4$-alkylamines, trihydroxy-$C_1$-$C_4$-alkylamines, mono-$C_1$-$C_4$-alkylamines, di-$C_1$-$C_4$-alkylamines, tri-$C_1$-$C_4$-alkylamines, $C_1$-$C_4$-alkylenediamines, (tetrahydroxy-$C_1$-$C_4$-alkyl)-$C_1$-$C_4$-alkylenediamines, polyethyleneimines, polypropyleneimines and mixtures thereof.

20. Additive according to Embodiment 19, wherein the neutralizing agent is selected from ammonia, monohydroxy-$C_1$-$C_4$-alkylamines, dihydroxy-$C_1$-$C_4$-alkylamines, trihydroxy-$C_1$-$C_4$-alkylamines, $C_1$-$C_4$-alkylenediamines and polyethyleneimines.

21. Additive according to Embodiment 20, wherein the neutralizing agent is selected from ammonia, ethylenediamine, monoethanolamine, diethanolamine, triethanolamine and polyethyleneimines.

22. Additive according to any of the preceding embodiments, wherein the neutralizing agent is selected from alkali metal hydroxide, especially sodium or potassium hydroxide.

23. Additive according to any of the preceding embodiments, having a pH of 8 to 13.

24. Additive according to any of the preceding embodiments, having a pH of 9 to 13, especially >11.5 to 13.

25. Additive according to any of the preceding embodiments, wherein the polymeric dispersant has, as anionic or anionogenic group, at least one structural unit of the general formulae (Ia), (Ib), (Ic) and/or (Id):

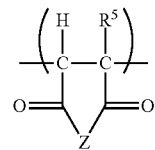 (Ia)

in which
$R^1$ is H or an unbranched or branched $C_1$-$C_4$-alkyl group, $CH_2COOH$ or $CH_2CO$—X—
$R^2$, preferably H or $CH_3$;
X is —NH—$(C_nH_{2n})$ or —O$(C_nH_{2n})$ with n=1, 2, 3 or 4, where the nitrogen atom or the oxygen atom is bonded to the CO group or is a chemical bond, preferably X=chemical bond or O$(C_nH_{2n})$;
$R^2$ is-OM, —$PO_3M_2$ or —O—$PO_3M_2$; with the proviso that X is a chemical bond when $R^2$ is OM;

(Ib)

in which
$R^3$ is H or an unbranched or branched $C_1$-$C_4$-alkyl group, preferably H or $CH_3$;
n is 0, 1, 2, 3 or 4, preferably 0 or 1;
$R^4$ is —$PO_3M_2$ or —O—$PO_3M_2$;

(Ic)

in which
$R^5$ is H or an unbranched or branched $C_1$-$C_4$-alkyl group, preferably H;
Z is O or $NR^7$, preferably O;
$R^7$ is H, —$(C_nH_{2n})$—OH, —$(C_nH_{2n})$—$PO_3M_2$, —$(C_nH_{2n})$—$OPO_3M_2$, —$(C_6H_4)$—$PO_3M_2$, or —$(C_6H_4)$—$OPO_3M_2$, and
n is 1, 2, 3 or 4, preferably 1, 2 or 3;

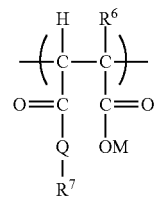 (Id)

in which
$R^6$ is H or an unbranched or branched $C_1$-$C_4$-alkyl group, preferably H;

Q is $NR^7$ or O, preferably O;

$R^7$ is H, $-(C_nH_{2n})-OH$, $-(C_nH_{2n})-PO_3M_2$, $-(C_nH_{2n})-OPO_3M_2$, $-(C_6H_4)-PO_3M_2$, or $-(C_6H_4)-OPO_3M_2$, n is 1, 2, 3 or 4, preferably 1, 2 or 3; and each M in the above formulae is independently H or one cation equivalent.

26. Additive according to Embodiment 25, wherein the polymeric dispersant has, as anionic or anionogenic group, at least one structural unit of the formula (Ia) in which $R^1$ is H or $CH_3$; and/or at least one structural unit of the formula (Ib) in which $R^3$ is H or $CH_3$; and/or at least one structural unit of the formula (Ic) in which $R^5$ is H or $CH_3$ and Z is O; and/or at least one structural unit of the formula (Id) in which $R^6$ is H and Q is O.

27. Additive according to Embodiment 25, wherein the polymeric dispersant has, as anionic or anionogenic group, at least one structural unit of the formula (Ia) in which $R^1$ is H or $CH_3$ and $XR^2$ is OM or X is $O(C_nH_{2n})$ with n=1, 2, 3 or 4, especially 2, and $R^2$ is $O-PO_3M_2$.

28. Additive according to any of the preceding embodiments, wherein the polymeric dispersant has, as polyether side chain, at least one structural unit of the general formulae (IIa), (IIb), (IIc) and/or (IId):

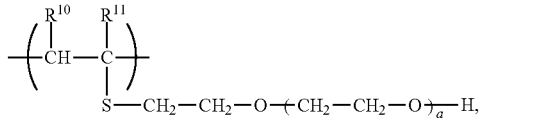
(IIa), (IIa-1) or (IIa-2)

in which $R^{10}$, $R^{11}$ and $R^{12}$ are each independently H or an unbranched or branched $C_1$-$C_4$-alkyl group;

Z is O or S;

E is an unbranched or branched $C_1$-$C_6$-alkylene group, a cyclohexylene group, $CH_2-C_6H_{10}$, 1,2-phenylene, 1,3-phenylene or 1,4-phenylene;

G is O, NH or CO—NH; or

E and G together are a chemical bond;

A is $C_xH_{2x}$ with x=2, 3, 4 or 5 or $CH_2CH(C_6H_5)$;

n is 0, 1, 2, 3, 4 and/or 5;

a is an integer from 2 to 350;

$R^{13}$ is H, an unbranched or branched $C_1$-$C_4$-alkyl group, $CO-NH_2$ and/or $COCH_3$;

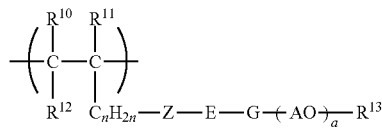
(IIa-1)

where $R^{10}$ and $R^{11}$ are each independently H or $CH_3$, preferably H;

E is $C_2$-$C_4$-alkylene;

A is $C_xH_{2x}$ with x=2 or 3;

a is 2 to 200, especially from 2 to 160, preferably from 5 to 140, more preferably 10 to 80 or 20 to 30; and $R^{13}$ is H or $C_1$-$C_4$-alkyl;

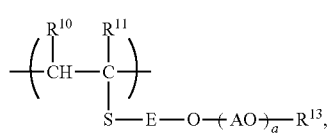
(IIa-2)

where $R^{10}$ and $R^{11}$ are H; and a is 2 to 200, preferably 5 to 160, more preferably 10 to 140, most preferably 20 to 140 or 20 to 30.

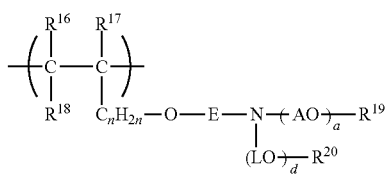
(IIb)

in which $R^{16}$, $R^{17}$ and $R^{18}$ are each independently H or an unbranched or branched $C_1$-$C_4$-alkyl group;

E is an unbranched or branched $C_1$-$C_6$-alkylene group, a cyclohexylene group, $CH_2-C_6H_{10}$, 1,2-phenylene, 1,3-phenylene or 1,4-phenylene, or is a chemical bond;

A is $C_xH_{2x}$ with x=2, 3, 4 or 5 or $CH_2CH(C_6H_5)$, preferably 2 or 3;

n is 0, 1, 2, 3, 4 or 5, preferably 0, 1 or 2;

L is $C_xH_{2x}$ with x=2, 3, 4 or 5 or $CH_2CH(C_6H_5)$, preferably 2 or 3;

a is an integer from 2 to 350, preferably 5 to 150;

d is an integer from 1 to 350, preferably 5 to 150;

$R^{19}$ is H or an unbranched or branched $C_1$-$C_4$-alkyl group; and $R^{20}$ is H or an unbranched $C_1$-$C_4$-alkyl group;

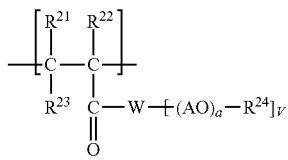
(IIc)

in which $R^{21}$, $R^{22}$ and $R^{23}$ are each independently H or an unbranched or branched $C_1$-$C_4$-alkyl group;

W is O, $NR^{25}$ or N;

V is 1 when W=O or $NR^{25}$, and is 2 when W=N;

A is $C_xH_{2x}$ with x=2, 3, 4 or 5 or $CH_2CH(C_6H_5)$, preferably 2 or 3;

a is an integer from 2 to 350, preferably 5 to 150;

$R^{24}$ is H or an unbranched or branched $C_1$-$C_4$-alkyl group; and $R^{25}$ is H or an unbranched or branched $C_1$-$C_4$-alkyl group;

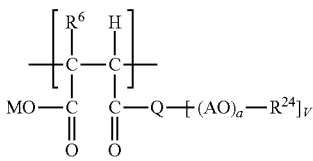

(IId)

in which

R⁶ is H or an unbranched or branched $C_1$-$C_4$-alkyl group, preferably H;

Q is $NR^{10}$, N or O;

M is H or one cation equivalent;

V is 1 when W=O or $NR^{10}$, and is 2 when W=N;

$R^{10}$ is H or an unbranched or branched $C_1$-$C_4$-alkyl group; and

A is $C_xH_{2x}$ with x=2, 3, 4 or 5 or $CH_2C(C_6H_5)H$, preferably 2 or 3;

$R^{24}$ is H or an unbranched or branched $C_1$-$C_4$-alkyl group; and a is an integer from 2 to 350, preferably 5 to 150.

29. Additive according to Embodiment 28, wherein the polymeric dispersant has, as polyether side chain:

(a) at least one structural unit of the formula (IIa) in which $R^{10}$ and $R^{12}$ are H, $R^{11}$ is H or $CH_3$, E and G together are a chemical bond, A is $C_xH_{2x}$ with x=2 and/or 3, a is 3 to 150, and $R^{13}$ is H or an unbranched or branched $C_1$-$C_4$-alkyl group; and/or (b) at least one structural unit of the formula (IIb) in which $R^{16}$ and $R^{18}$ are H, $R^{17}$ is H or $CH_3$, E is an unbranched or branched $C_1$-$C_6$-alkylene group, A is $C_xH_{2x}$ with x=2 and/or 3, L is $C_xH_{2x}$ with x=2 and/or 3, a is an integer from 2 to 150, d is an integer from 1 to 150, $R^{19}$ is H or an unbranched or branched $C_1$-$C_4$-alkyl group, and $R^{20}$ is H or an unbranched or branched $C_1$-$C_4$-alkyl group; and/or (c) at least one structural unit of the formula (IIc) in which $R^{21}$ and $R^{23}$ are H, $R^{22}$ is H or $CH_3$, A is $C_xH_{2x}$ with x=2 and/or 3, a is an integer from 2 to 150, and $R^{24}$ is H or an unbranched or branched $C_1$-$C_4$-alkyl group; and/or (d) at least one structural unit of the formula (IId) in which $R^6$ is H, Q is O, $R^7$ is $(C_nH_{2n})$—O-$(AO)_a$—$R^9$, n is 2 and/or 3, A is $C_xH_{2x}$ with x=2 and/or 3, a is 1 to 150, and $R^9$ is H or an unbranched or branched $C_1$-$C_4$-alkyl group.

30. Additive according to either of Embodiments 28 and 29, wherein the polymeric dispersant comprises at least one structural unit of the formula (IIa) and/or (IIc).

31. Additive according to any of Embodiments 1 to 24, wherein the polymeric dispersant is a polycondensation product comprising structural units (III) and (IV):

(III)

in which

T is a substituted or unsubstituted phenyl or unsubstituted naphthyl radical or a substituted or unsubstituted heteroaromatic radical having 5 to 10 ring atoms, of which 1 or 2 ring atoms are heteroatoms selected from N, O and S;

n is 1 or 2;

B is N, NH or O, with the proviso that n is 2 when B is N and the proviso that n is 1 when B is NH or O;

A is $C_xH_{2x}$ with x=2, 3, 4 or 5 or $CH_2CH(C_6H_5)$;

a is an integer from 1 to 300, preferably 5 to 150;

$R^{25}$ is H, a branched or unbranched $C_1$- to $C_{10}$-alkyl radical, $C_5$- to $C_8$-cycloalkyl radical, aryl radical or heteroaryl radical having 5 to 10 ring atoms, of which 1 or 2 atoms are heteroatoms selected from N, O and S;

where the structural unit (IV) is selected from the structural units (IVa) and (IVb)

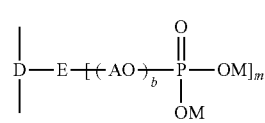

(IVa)

in which

D is a substituted or unsubstituted phenyl or substituted or unsubstituted naphthyl radical or is a substituted or unsubstituted heteroaromatic radical having 5 to 10 ring atoms, of which 1 or 2 ring atoms are heteroatoms selected from N, O and S;

E is N, NH or O, with the proviso that m is 2 when E is N and the proviso that m is 1 when E is NH or O;

A is $C_xH_{2x}$ with x=2, 3, 4 or 5 or $CH_2CH(C_6H_5)$;

b is an integer from 1 to 300, preferably 1 to 50;

M is independently H, one cation equivalent; and

(IVb)

in which

V is a substituted or unsubstituted phenyl or substituted or unsubstituted naphthyl radical, where V is optionally substituted by one or two radicals independently selected from $R^8$, OH, $OR^8$, $(CO)R^8$, COOM, $COOR^8$, $SO^3R^8$ and $NO^2$, preferably OH, $OC_1$-$C_4$-alkyl and $C_1$-$C_4$-alkyl;

$R^7$ is COOM, $OCH^2COOM$, $SO^3M$ or $OPO_3M_2$;

M is H or one cation equivalent; and $R^8$ is $C_1$-$C_4$-alkyl, phenyl, naphthyl, phenyl-$C_1$-$C_4$-alkyl or $C_1$-$C_4$-alkylphenyl.

32. Additive according to Embodiment 31, wherein T is a substituted or unsubstituted phenyl or naphthyl radical, E is NH or O, A is $C_xH_{2x}$ with x=2 and/or 3, a is an integer from 1 to 150, and $R^{25}$ is H or a branched or unbranched $C_1$- to $C_{10}$-alkyl radical.

33. Additive according to Embodiment 31, wherein D is a substituted or unsubstituted phenyl or naphthyl radical, E is NH or O, A is $C_xH_{2x}$ with x=2 and/or 3 and b is an integer from 1 to 150.

34. Additive according to any of Embodiments 31 to 33, wherein T and/or D is phenyl or naphthyl substituted by 1 or 2 $C_1$-$C_4$-alkyl or hydroxyl or 2 $C_1$-$C_4$-alkoxy groups.

35. Additive according to Embodiment 31, wherein V is phenyl or naphthyl substituted by 1 or 2 $C_1$-$C_4$-alkyl, OH, $OCH^3$ or COOM, and $R^7$ is COOM or $OCH^2COOM$.

36. Additive according to any of Embodiments 31 to 35, wherein the polycondensation product comprises a further structural unit (V) of the formula

umfasst,
in which
R[5] and R[6] may be the same or different and are H, CH$_3$, COOH or a substituted or unsubstituted phenyl or naphthyl group or a substituted or unsubstituted heteroaromatic group having 5 to 10 ring atoms, of which 1 or 2 atoms are heteroatoms selected from N, O and S.

37. Additive according to Embodiment 36, in which R[5] and R[6] may be the same or different and are H, CH$_3$, or COOH, especially H, or one of the R[5] and R[6] radicals is H and the other is CH$_3$.

38. Additive according to any of Embodiments 1 to 30, wherein the polymeric dispersant has units of the formulae (I) and (II), especially of the formulae (Ia) and (IIa).

39. Additive according to any of Embodiments 1 to 30, wherein the polymeric dispersant has structural units of the formulae (Ia) and (IIc).

40. Additive according to any of Embodiments 1 to 30, wherein the polymeric dispersant has structural units of the formulae (Ic) and (IIa).

41. Additive according to any of Embodiments 1 to 30, wherein the polymeric dispersant has structural units of the formulae (Ia), (Ic) and (IIa).

42. Additive according to any of Embodiments 1 to 30, wherein the polymeric dispersant is formed from (i) anionic or anionogenic structural units derived from acrylic acid, methacrylic acid, maleic acid, hydroxyethyl acrylate phosphate and/or hydroxyethyl methacrylate phosphate, hydroxyethyl acrylate phosphonate and/or hydroxyethyl methacrylate phosphonate, and (ii) polyether side chain structural units derived from C$_1$-C$_4$-alkyl polyethylene glycol acrylate, polyethylene glycol acrylate, C$_1$-C$_4$-alkyl polyethylene glycol methacrylate, polyethylene glycol methacrylate, C$_1$-C$_4$-alkyl polyethylene glycol acrylate, polyethylene glycol acrylate, vinyloxy C$_2$-C$_4$-alkylene polyethylene glycol, vinyloxy C$_2$-C$_4$-alkylene polyethylene glycol C$_1$-C$_4$-alkyl ether, allyloxy polyethylene glycol, allyloxy polyethylene glycol C$_1$-C$_4$-alkyl ether, methallyloxy polyethylene glycol, methallyloxy polyethylene glycol C$_1$-C$_4$-alkyl ether, isoprenyloxy polyethylene glycol and/or isoprenyloxy polyethylene glycol —C$_1$-C$_4$-alkyl ether.

43. Additive according to Embodiment 42, wherein the polymeric dispersant is formed from structural units (i) and (ii) which are derived from
(i) hydroxyethyl acrylate phosphate and/or hydroxyethyl methacrylate phosphate and
(ii) C$_1$-C$_4$-alkyl polyethylene glycol acrylate and/or C$_1$-C$_4$-alkyl polyethylene glycol methacrylate; or
(i) acrylic acid and/or methacrylic acid and (ii) C$_1$-C$_4$-alkyl polyethylene glycol acrylate and/or C$_1$-C$_4$-alkyl polyethylene glycol methacrylate; or
(i) acrylic acid, methacrylic acid and/or maleic acid and (ii) vinyloxy C$_2$-C$_4$-alkylene polyethylene glycol, allyloxy polyethylene glycol, methallyloxy polyethylene glycol and/or isoprenyloxy polyethylene glycol.

44. Additive according to Embodiment 42, wherein the polymeric dispersant is formed from structural units (i) and (ii) which are derived from
(i) hydroxyethyl methacrylate phosphate and (ii) C$_1$-C$_4$-alkyl polyethylene glycol methacrylate or polyethylene glycol methacrylate; or
(i) methacrylic acid and (ii) C$_1$-C$_4$-alkyl polyethylene glycol methacrylate or polyethylene glycol methacrylate; or
(i) acrylic acid and maleic acid and (ii) vinyloxy C$_2$-C$_4$-alkylene polyethylene glycol or
(i) acrylic acid and maleic acid and (ii) isoprenyloxy polyethylene glycol or
(i) acrylic acid and (ii) vinyloxy C$_2$-C$_4$-alkylene polyethylene glycol or
(i) acrylic acid and (ii) isoprenyloxy polyethylene glycol or
(i) acrylic acid and (ii) methallyloxy polyethylene glycol or
(i) maleic acid and (ii) isoprenyloxy polyethylene glycol or
(i) maleic acid and (ii) allyloxy polyethylene glycol or
(i) maleic acid and (ii) methallyloxy polyethylene glycol.

45. Additive according to any of Embodiments 25 to 30, wherein the molar ratio of the structural units (I):(II) is 1:4 to 15:1, especially 1:1 to 10:1.

46. Additive according to any of the preceding embodiments, wherein the molar mass of the polyether side chains is >2000 g/mol, preferably >4000 g/mol.

47. Additive according to Embodiment 46, wherein the molar mass of the polyether side chains is in the range of 2000-8000 g/mol, especially 4000-6000 g/mol.

48. Additive according to any of the preceding embodiments, wherein the charge density of the polymeric dispersant is in the range of 0.7-1.5 mmol/g, preferably between 0.8-1.25 mmol/g.

49. Additive according to any of the preceding embodiments, wherein the molar mass of the polymeric dispersant is in the range from 10 000 g/mol to 80 000 g/mol, preferably 15 000 g/mol to 55 000 g/mol.

50. Additive according to any of Embodiments 31 to 37, wherein the molar ratio of the structural units (III):(IV) is 4:1 to 1:15, especially 2:1 to 1:10.

51. Additive according to any of Embodiments 31 to 37, wherein the molar ratio of the structural units (III+IV):(V) is 2:1 to 1:3, especially 1:0.8 to 1:2.

52. Additive according to any of Embodiments 31 to 37 or 50 to 51, wherein the polymeric dispersant is formed from structural units of the formulae (III) and (IV) in which T and D are phenyl or naphthyl, where the phenyl or naphthyl is optionally substituted by 1 or 2 C$_1$-C$_4$-alkyl or hydroxyl or 2 C$_1$-C$_4$-alkoxy groups, B and E are 0, A is C$_x$H$_{2x}$ with x=2, a is 3 to 150, especially 10 to 150, and b is 1, 2 or 3.

53. Additive according to any of the preceding embodiments, obtainable by precipitating the salt of the polyvalent metal cation in the presence of the polymeric dispersant in order to obtain a colloidally disperse preparation of the salt.

54. Additive according to any of the preceding embodiments, obtainable by dispersing a freshly precipitated salt of the polyvalent metal cation in the presence of the polymeric dispersant in order to obtain a colloidally disperse preparation of the salt.

55. Additive according to Embodiment 53 or 54, wherein the colloidally disperse formulation is admixed with a neutralizing agent.

56. Additive according to any of the preceding embodiments, wherein the ratio according to formula (a) is in the range from 1 to 10.

57. Additive according to any of the preceding embodiments, additionally comprising calcium silicate hydrate.

58. Additive according to Embodiment 57, wherein the calcium silicate hydrate is included in an amount of 25% by weight to 75% by weight, based on the solids content of the additive.

59. Building material mixture comprising an additive according to any of Embodiments 1 to 58 and a binder selected from (portland) cement, slag sand, fly ash, silica dust, metakaolin, natural pozzolans, burnt oil shale, calcium aluminate cement and mixtures thereof.

60. Building material mixture according to Embodiment 59, comprising (portland) cement as hydraulic binder.

61. Building material mixture according to Embodiment 59, comprising essentially no (0% to 5% by weight of) portland cement.

According to one embodiment, the metal cation is present in an amount corresponding to the following formula (a):

$$0.1 < \frac{\sum_i z_{K,i} * n_{K,i}}{\sum_j z_{S,j} * n_{S,j}} < 50 \quad (a)$$

where $z_{K,i}$ is the magnitude of the charge of the polyvalent metal cation, $n_{K,i}$ is the number of moles of the polyvalent metal cation weighed in, $z_{S,j}$ is the magnitude of the charge of the anionic and anionogenic group present in the polymeric dispersant, $n_{S,j}$ is the number of moles of the anionic and anionogenic group present in the polymeric dispersant weighed in, the indices i and j are independent of one another and are an integer greater than 0, i is the number of different kinds of polyvalent metal cations and j is the number of different kinds of anionic and anionogenic groups present in the polymeric dispersant, where z is defined such that the charge for cations is always based on the full formal charge, i.e. $z_{Fe}(FeCl_3)=3$, $z_{Fe}(FeCl_2)=2$. In addition, z is the magnitude of the formal charge of the anions (organic phosphonates, organic phosphates and optionally present inorganic anions) with maximum deprotonation, i.e. $z_{PO4}(H_3PO_4)=z_{PO4}(Na_3PO_4)=3$; $z_{PO4}(H_3PO_4)=z_{PO4}(Na_3PO_4)=3$, or $z_{COO^-}=1$; $z_{CO3}(Na_2CO_3)=2$ or $z_{PO3}(vinylphosphonate)=z_{PO4}$ (phenoxyethanolphosphate)=2, or $z_{CO3}(Na_2CO_3)=2$. In the case of aluminate, the value is set at $z_{AlO2}(NaAlO_2)=z_{AlO2}(NaAl(OH)_4)=1$; in the case of silicate, the value for all silicate species is set at $z_{SiO3}(Na_2SiO_3)=2$.

The sum total over the product of charge $z_{S,j}$ and number of moles $n_{S,j}$ in mmol/g of the polymeric dispersant can be determined by various known methods, for example by the determination by charge density titration with a polycation as described, for example, in J. Plank et al., Cem. Conr. Res. 2009, 39, 1-5. In addition, the person skilled in the art familiar with the prior art will be able to determine this value from the starting monomer weights for the synthesis of the polymeric comb polymer in a simple calculation (see calculation for Example 41). Finally, it is possible to experimentally obtain the numerical value of the sum total over the product of $z_s$ and $n_s$ by determining the ratios of the polymer units by nuclear resonance spectroscopy (NMR). What is used for this purpose is, in particular, the integration of the signals in the 1H NMR spectrum of a comb polymer.

The polyvalent metal cation is selected from $Al^{3+}$, $Fe^{3+}$, $Fe^{2+}$, $Zn^{2+}$, $Mn^{2+}$, $Cu^{2+}$, $Ca^{2+}$, $Mg^{2+}$, $Sr^{2+}$, $Ba^{2+}$ and mixtures thereof, preferably selected from $Al^{3+}$, $Fe^{3+}$, $Fe^{2+}$, $Mn^{2+}$, $Zn^{2+}$, $Ca^{2+}$ and mixtures thereof, more preferably selected from $Al^{3+}$, $Fe^{3+}$, $Fe^{2+}$, $Ca^{2+}$ and mixtures thereof and especially selected from $Al^{3+}$, $Fe^{3+}$, $Fe^{2+}$, and mixtures thereof.

Preferably, the counteranion of the polyvalent metal cation salt used is chosen such that the salts have good water solubility, the solubility under standard conditions of 20° C. and standard pressure preferably being greater than 10 g/l, more preferably greater than 100 g/l and especially preferably greater than 200 g/l. The numerical value of the solubility is based on the solution equilibrium ($MX=M^{n+}+X^{n-}$, where $M^{n+}$: metal cation; $X^{n-}$: anion) of the pure substance of the salt in deionized water at 20° C. and standard pressure, and does not take account of the effects resulting from protonation equilibria (pH) and complexation equilibria.

Preference is given to the sulphate anions, or a singly charged counteranion, preferably a nitrate, acetate, formate, hydrogensulphate, halide, halogenate, pseudohalide, methanesulphonate and/or amidosulphonate. From the group of the halides, particular preference is given to chloride. The pseudohalides include cyanide, azide, cyanate, thiocyanate, fulminate. It is also possible to use double salts as metal salt. Double salts are salts having two or more different cations. One example is alum ($KAl(SO_4)_2.12H_2O$), which is suitable as an aluminium salt. The metal cation salts having the aforementioned counteranions have good water solubility and hence particularly good suitability, since higher concentrations of the aqueous metal salt solutions (as reactant) can be established.

The magnitude of the charge of the anionic and anionogenic groups present in the polymeric dispersant refers to that charge present in the case of full deprotonation of the anionogenic group.

Anionic groups are the deprotonated acid groups present in the polymeric dispersant. Anionogenic groups are the acid groups present in the polymeric dispersant. In the formation of the sum total of the molar amounts of the anionic and anionogenic groups present in the polymeric dispersant, groups which are simultaneously anionic and anionogenic, such as partly deprotonated basic acid radicals, are counted exclusively with the anionic groups.

Different kinds of polyvalent metal cations refer to polyvalent metal cations of different elements. In addition, different kinds of polyvalent metal cations also refer to metal cations of the same element having a different charge.

Anionic and anionogenic groups in the polymeric dispersant that cannot be interconverted by protonation are referred to as being of a different kind.

The ratio according to formula (a) is preferably in the range from 0.5 to 40, >1 to 30 or 1 to 10. Preferably, the ratio is in the range from 1 to 8 or 1.1 to 8 or 1 to 6 or 1.1 to 6 or 1.2 to 6, and especially in the range from 1 to 5 or 1.1 to 5 or 1.2 to 5 or 1.25 to 5.

Even when a superstoichiometric amount of the polyvalent metal cation is present, some of the acid groups in the polymeric dispersant may be present in the form of anionogenic groups.

In a preferred embodiment, the additive for hydraulically setting compositions comprises at least one organic phosphonate or phosphate compound as anion capable of forming a sparingly soluble salt with the polyvalent metal cation, "sparingly soluble salt" referring to a salt having a solubility in water under standard conditions of 20° C. and standard pressure of less than 5 g/l, preferably less than 1 g/l. Organic phosphates are compounds having at least one phosphate group having an organic radical on one or two oxygen atoms. Organic phosphonates are compounds having at least one phosphonate group in which one organic radical is bonded to the phosphorus atom.

The organic radical in the phosphate and phosphonate group is preferably a $C_1$-$C_{12}$-alkyl or alkenyl radical which may optionally be substituted and/or may be interrupted by a nitrogen and/or oxygen atom, or a poly($C_2$-$C_4$-alkoxy) radical having 1 to 300, preferably 2 to 300 or 2 to 100, alkoxy units.

In an embodiment, the organic phosphate or the organic phosphonate is different from the polymeric dispersant comprising anionic and/or anionogenic groups and polyether side chains and/or does not include repeating units that carry phosphonate or phosphate groups.

According to a further embodiment, the anion is present in an amount corresponding to the following formula (b):

$$0 < \frac{\sum_l z_{A,l} * n_{A,l}}{\sum_l z_{K,i} * n_{K,i}} < 3$$

where $z_{K,i}$ is the magnitude of the charge of the polyvalent metal cation, $n_{K,i}$ is the number of moles of the polyvalent metal cation weighed in, $z_{A,l}$ is the charge of the anion weighed in, $n_{A,l}$ is the number of moles of the anion weighed in.

The ratio according to formula (b) is preferably in the range from >0 to 3, preferably 0.1 to 2, more preferably 0.2 to 1.5. The disclosure herein includes any combination of the above-mentioned ranges for formula (a) with any range for formula (b), such as those given in embodiments 6, 7, and 8 for formula (a) and in embodiments 9 and 10 for formula (b). For example, the disclosure includes any combination of the range from ≥0.5 to ≤40 of embodiment 6 with any of the ranges in embodiments 9 and 10. The same is likewise applicable for the other ranges of embodiments 6, 7 and 8 and vice versa for the ranges in embodiments 9 and 10 combined with any range in embodiments 6, 7 and 8.

Preferably, the countercation of the anion salt which can form a sparingly soluble salt with the polyvalent metal cation is a singly charged cation or a proton, preferably an alkali metal cation and/or ammonium ion. The ammonium ion may also include an organic ammonium ion, for example alkylammonium ions having one to four alkyl radicals. The organic radical may also be aromatic in nature or include aromatic radicals. The ammonium ion may also be an alkanolammonium ion.

The inorganic anion is selected from carbonate, oxalate, silicate, phosphate, polyphosphate, phosphite, borate, aluminate and sulphate. The anion is preferably selected from carbonate, silicate, phosphate and aluminate; the anion is more preferably phosphate.

The anions mentioned also include the polymeric borate, silicate and oxalate anions, and the polyphosphates. The term "polymeric anions" is understood to mean anions which, as well as oxygen atoms, include at least two atoms from the group of boron, carbon, silicon and phosphorus. Particular preference is given to oligomers having a number of atoms between 2 and 20, especially preferably 2 to 14 atoms, most preferably 2 to 5 atoms. The number of atoms in the silicates is more preferably in the range from 2 to 14 silicon atoms, and in the polyphosphates preferably in the range from 2 to 5 phosphorus atoms.

Compounds capable of releasing a silicate include $Na_2SiO_3$ and waterglass having a modulus, defined as the ratio of $SiO_2$ to alkali metal oxide, in the range from 1/1 to 4/1, more preferably 1/1 to 3/1.

In the case of the silicates, it is possible that some of the silicon atoms in the silicates are replaced by aluminium. Corresponding compounds are known from the class of the the aluminosilicates. Preferably, the proportion of aluminium is less than 10 mol % based on the sum total of silicon and aluminium; more preferably, the aluminium content is equal to zero.

The additive for hydraulically setting compositions may additionally comprise at least one neutralizing agent.

Preferably, the neutralizing agent is an organic amine, a polyamine or ammonia, since these neutralizing agents more efficiently prevent the coagulation of precipitating salt. Suitable organic amines are especially an aliphatic monoamine or aliphatic polyamine. Polyamines are also diamines and triamines.

The neutralizing agent is preferably selected from ammonia, monohydroxy-$C_1$-$C_4$-alkylamines, dihydroxy-$C_1$-$C_4$-alkylamines, trihydroxy-$C_1$-$C_4$-alkylamines, mono-$C_1$-$C_4$-alkylamines, di-$C_1$-$C_4$-alkylamines, tri-$C_1$-$C_4$-alkylamines, $C_1$-$C_4$-alkylenediamines, (tetrahydroxy-$C_1$-$C_4$-alkyl)-$C_1$-$C_4$-alkylenediamines, polyethyleneimines, polypropyleneimines and mixtures thereof.

More preferably, the neutralizing agent is selected from ammonia, monohydroxy-$C_1$-$C_4$-alkylamines, dihydroxy-$C_1$-$C_4$-alkylamines, trihydroxy-$C_1$-$C_4$-alkylamines, $C_1$-$C_4$-alkylenediamines and polyethyleneimines.

Especially preferred neutralizing agents are selected from ammonia, ethylenediamine, monoethanolamine, diethanolamine, triethanolamine and polyethyleneimines.

Preferably, the additive for hydraulically setting compositions has a pH of 8 to 13, preferably 9 to 13, especially 10 to 13.

The anionic and ionogenic groups are preferably carboxyl, carboxylate or phosphate groups, hydrogenphosphate or dihydrogenphosphate groups.

In one embodiment, the polymeric dispersant has at least one structural unit of the above-defined general formulae (Ia), (Ib), (Ic) and/or (Id), where the structural units (Ia), (Ib), (Ic) and (Id) may be the same or different both within individual polymer molecules and between different polymer molecules.

M in the formulae mentioned above is preferably an alkali metal ion, especially the sodium ion, ½ alkaline earth metal ion (i.e. one equivalent), especially ½ calcium ion, the ammonium ion, or an organic ammonium ion such as a $C_1$-$C_4$-alkylamine or a monohydroxy-$C_1$-$C_4$-alkylamine.

More preferably, the structural unit according to formula Ia is methacrylic acid or acrylic acid unit, the structural unit according to formula Ic is a maleic anhydride unit, and the structural unit according to formula Id is a maleic acid or maleic monoester unit.

To the extent that the monomers (I) are phosphoric esters or phosphonic esters, they may also include the corresponding di- and triesters and monoesters of diphosphoric acid. These generally form in the esterification of organic alcohols with phosphoric acid, polyphosphoric acid, phosphorus oxides, phosphorus halides or phosphorus oxyhalides or the corresponding phosphonic acid compounds alongside the monoester in different proportions, for example 5-30 mol % of diester and 1-15 mol % of triester, and also 2-20 mol % of the monoester of diphosphoric acid.

In one embodiment, the polymeric dispersant has at least one structural unit of the above-defined general formulae (IIa), (IIb), (IIc) and/or (IId). The general formulae (IIa), (IIb), (IIc) and (IId) may be the same or different both within individual polymer molecules and between different polymer molecules. All structural units A may be the same or different both within individual polyether side chains and between different polyether side chains.

More preferably, the structural unit according to formula IIa is an alkoxylated isoprenyl unit, alkoxylated hydroxybutyl vinyl ether unit, alkoxylated (meth)allyl alcohol unit or a vinylated methyl polyalkylene glycol unit, in each case preferably with an arithmetic mean of 2 to 350 oxyalkylene groups.

According to one embodiment, the polymeric dispersant contains the structural units of the formulae (I) and (II). As well as structural units of the formulae (I) and (II), the polymeric dispersant may also contain further structural units which derive from free-radically polymerizable monomers, such as hydroxyethyl (meth)acrylate, hydroxypropyl (meth)acrylate, (meth)acrylamide, ($C_1$-$C_4$)-alkyl (meth)acrylates, styrene, styrenesulphonic acid, 2-acrylamido-2-methylpropanesulphonic acid, (meth)allylsulphonic acid, vinylsulphonic acid, vinyl acetate, acrolein, N-vinylformamide, vinylpyrrolidone, (meth)allyl alcohol, isoprenol, 1-butyl vinyl ether, isobutyl vinyl ether, aminopropyl vinyl ether, ethylene glycol monovinyl ether, 4-hydroxybutyl monovinyl ether, (meth)acrolein, crotonaldehyde, dibutyl maleate, dimethyl maleate, diethyl maleate, dipropyl maleate, etc.

The mean molecular weight $M_w$ of the salt of polyvalent metal cation and polymeric dispersant, determined by gel permeation chromatography (GPC), is generally in the range from about 15 000 to about 1 000 000.

The mean molecular weight $M_w$ of the polymeric dispersant (comb polymer), preferably of the water-soluble comb polymer, determined by gel permeation chromatography (GPC), is preferably 5000 to 200 000 g/mol, more preferably 10 000 to 80 000 g/mol and most preferably 15 000 to 70 000 g/mol. The molecular weight was determined as described in detail below.

Preferably, the comb polymer meets the demands of industrial standard EN 934-2 (February 2002).

The preparation of the polymeric dispersants containing the structural units (I) and (II) is effected in a customary manner, for example by radical polymerization. It is described, for example, in EP0894811, EP1851256, EP2463314, EP0753488.

In one embodiment, the polymeric dispersant is a polycondensation product comprising the above-defined structural units (III) and (IV).

The structural units T and D in the general formula (III) and (IV) of the polycondensation product are preferably derived from phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl, 4-methoxynaphthyl, phenoxyacetic acid, salicylic acid, preferably from phenyl, where T and D may be chosen independently of one another and may also each be derived from a mixture of the radicals mentioned. The B and E groups are each independently preferably O. All structural units A may be the same or different both within individual polyether side chains and between different polyether side chains. In a particularly preferred embodiment, A is $C_2H_4$.

In the general formula (III), a is preferably an integer from 1 to 300 and especially 5 to 150, and, in the general formula (IV), b is preferably an integer from 1 to 300, especially 1 to 50 and more preferably 1 to 10. In addition, the radicals of the general formulae (III) or (IV) may each independently have the same chain length, where a and b are each represented by a number. It will generally be appropriate when mixtures having different chain lengths are present in each case, such that the radicals of the structural units in the polycondensation product for a and independently for b have different numerical values.

In general, the polycondensation product according to the invention has a weight-average molecular weight of 5000 g/mol to 200 000 g/mol, preferably 10 000 to 100 000 g/mol and more preferably 15 000 to 55 000 g/mol.

The molar ratio of the structural units (III):(IV) is typically 4:1 to 1:15 and preferably 2:1 to 1:10. It is advantageous to have a relatively high proportion of structural units (IV) in the polycondensation product, since a comparatively high negative charge of the polymers has a good influence on the stability of the aqueous colloidally disperse preparation. The molar ratio of the structural units (IVa):(IVb), when both are present, is typically 1:10 to 10:1 and preferably 1:3 to 3:1.

In a preferred embodiment of the invention, the polycondensation product contains a further structural unit (V) which is represented by the following formula:

in which
$R^5$ is H, $CH_3$, COOH or substituted or unsubstituted phenyl or naphthyl;
$R^6$ is H, $CH_3$, COOH or substituted or unsubstituted phenyl or naphthyl.

Preferably, $R^5$ and $R^6$ are H, or one of the $R^5$ and $R^6$ radicals is H and the other is $CH_3$.

Typically, $R^5$ and $R^6$ in structural unit (V) are the same or different and are H, COOH and/or methyl. Very particular preference is given to H.

In another embodiment, the molar ratio of the structural units [(III)+(IV)]: (V) in the polycondensate is 2:1 to 1:3, preferably 1:0.8 to 1:2.

The polycondensates are typically prepared by a process in which the compounds that underlie the structural units (III), (IV) and (V) are reacted with one another. The preparation of the polycondensates is described, for example, in WO 2006/042709 and WO 2010/026155.

Preferably, the monomer having a keto group is an aldehyde or ketone. Examples of monomers of the formula (V) are formaldehyde, acetaldehyde, acetone, glyoxylic acid and/or benzaldehyde. Formaldehyde is preferred.

The polymeric dispersant according to the invention may also be present in the form of its salts, for example of the sodium, potassium, organic ammonium, ammonium and/or calcium salt, preferably as the sodium and/or calcium salt.

The organic phosphonic acid or phosphonate compounds are commercially available—for example Cublen K3014®, Cublen API® and Cublen R60® from Zschimmer & Schwarz—or vinylphosphonic acid from Sigma-Aldrich, or can be prepared by known processes as described, for example, in WO2006042709 page 13 line 5 to line 20 (phenoxyethanol phosphate).

Preferably, the additives contain 50% to 95% water and 5% to 50% solids, more preferably 45%-85% water and 15% to 45% solids. The solid comprises the polymer and the polyvalent metal cation salt according to the invention, and optionally a further anion salt, the anion of which forms a sparingly soluble salt with the polyvalent metal cation.

According to one embodiment, the additive additionally contains calcium silicate hydrate, especially a calcium silicate hydrate preparation which has been prepared in the presence of a polymeric dispersant which has been described in detail above and comprises an anionic and/or anionogenic groups and polyether side chains. Such a calcium silicate hydrate preparation is described, for example, in WO 2010/026155, to which reference is made in full. The additive contains the calcium silicate hydrate generally in an amount in the range from 25% to 75% by weight, based on the solids content of the additive. When the calcium silicate hydrate is present in the form of the preparation mentioned, this stated amount is based on the total solids content of the preparation.

The additive according to the invention may be present as an aqueous product in the form of a solution, emulsion or dispersion, or in solid form, for example as a powder, after a drying step. The additive in solid form is colloidally redispersible in water. The water content of the additive in solid form is preferably less than 10% by weight, more preferably less than 5% by weight. It is also possible to replace a portion of the water, preferably up to 10% by weight, with organic solvents. Advantageous organic solvents are alcohols such as ethanol, isopropanol, propanol and 1-butanol, including isomers thereof. It is also possible to use acetone. Through the use of the organic solvents, it is possible to influence the solubility and hence the crystallization characteristics of the salts according to the invention.

The additives according to the invention are produced by contacting the salt of the polyvalent metal cation and the polymeric dispersant in an aqueous medium, in solid form or in a polymer melt. Preference is given to using a water-soluble salt of the polyvalent metal cation. The salt of the metal cation can be provided in solid form, but appropriately as an aqueous solution or suspension. It is therefore possible to add the metal cation salt as a powder, as an aqueous solution or else as an aqueous slurry to an aqueous solution of a dispersant.

The water-soluble anion salt can likewise be used either in solid form (in situ preparation of a solution, or contacting with the polymer melt) or else preferably in the form of an aqueous solution.

An additive according to the invention for hydraulically setting compositions can be obtained by precipitating the salt of the polyvalent metal cation in the presence of the polymeric dispersant, giving a colloidally disperse preparation of the salt. The precipitation of the salt of the polyvalent metal cation refers here to the formation of colloidally disperse salt particles which are dispersed by the polymeric dispersant and prevented from coagulating further.

Irrespective of whether the salt of the polyvalent metal cation is precipitated in the presence of the polymeric dispersant or whether a freshly precipitated salt of the polyvalent metal cation is dispersed in the presence of the polymeric dispersant, the additive according to the invention for hydraulically setting compositions can alternatively also be obtained by admixing the formulation additionally with a neutralizing agent as described above.

The additive is generally prepared by mixing the components that are preferably in the form of an aqueous solution. This is preferably done by first mixing the polymeric dispersant (comb polymer) and the polyvalent metal cation and then adding the anion capable of forming a sparingly soluble salt with the polyvalent metal cation. According to another embodiment, the polymeric dispersant (comb polymer) and the anion capable of forming a sparingly soluble salt with the polyvalent metal cation are first mixed and then the polyvalent metal cation is added. To adjust the pH, it is then possible to add an acid or base. The mixing of the components is generally effected at a temperature in the range from 5 to 80° C., appropriately 10 to 40° C., and especially at room temperature (about 20-30° C.).

An additive according to the invention for hydraulically setting compositions can also be obtained by dispersing a freshly precipitated salt of the polyvalent metal cation in the presence of the polymeric dispersant in order to obtain a colloidally disperse preparation of the salt. "Freshly precipitated" is understood to mean immediately after the precipitation, i.e. within about 5 minutes, preferably 2 minutes or 1 minute.

The preparation can be effected continuously or batch-wise. The components are generally mixed in a reactor having a mechanical stirrer system. The stirrer speed of the stirrer system may be between 10 rpm and 2000 rpm. Alternatively, it is possible to mix the solutions with the aid of a rotor-stator mixer which may have stirrer speeds in the range from 1000 to 30 000 rpm. In addition, it is also possible to employ other mixing geometries, for example a continuous process in which the solutions are mixed by means of a Y mixer.

Optionally, a further process step may follow for drying of the aqueous dispersion, such that the additive is present in the form of a solid and especially in powder form. The particle size of the powder is generally in the range from 10 to 500 μm, preferably 50 to 200 μm (the particle size of the powder was determined by laser granulometry on a Mastersizer 2000 (Malvern Instruments Ltd., Great Britain) by the fully automated measurement program implemented in the instrument (selected settings: agitation rate 40% and air pressure 1.5 bar)). The drying can be effected by roller drying, spray drying, drying in a fluidized bed method, by substance drying at elevated temperature or other standard drying methods. The preferred range for the drying temperature is between 50 and 230° C.

The additive according to the invention for hydraulically setting compositions can be used as a slump retainer in water-containing building material mixtures containing a hydraulic binder, the hydraulic binder being selected from (portland) cement, slag sand, fly ash, silica dust, metakaolin, natural pozzolans, burnt oil shale, calcium aluminate cement and mixtures of two or more of these components.

The term "slump retainer" in this application is understood to mean that the additives, over a processing time of up to 90 minutes, preferably up to 60 minutes, after mixing of the building material mixture with water, bring about a maximum slump of the binder suspension which is very substantially sufficient for the conditions of the particular application, especially one which essentially does not drop over the aforementioned period, without adversely affecting the properties of the mortar or concrete, especially the early strength. Early strength is understood here to mean the flexural and/or compressive strength of the mortar or concrete after 12 hours after mixing with the hydraulic binder.

The additives bring about optimal plasticization at a pH of about 12 and therefore allow unrestricted use with CSH without affecting the plasticization or early strength.

The additives according to the invention additionally enable a profile of properties tailored to the particular application. In addition, it is possible to add the additive not at the late mortar or concrete stage but at the early cement production stage. In that case, it simultaneously fulfils the function of a grinding auxiliary.

The concrete additives may, in addition to the colloidally disperse formulation according to the invention, be composed of polymeric plasticizer, polyvalent metal cation and anion according to the invention, contain still further components. These further components include water-reducing plasticizers, for example lignosulphonate, naphthalenesulphonate condensates, sulphonated melamine resins or conventional polycarboxylate ethers, and also defoamers, air pore formers, retardants, shrinkage reducers and/or hardening accelerators.

The invention also relates to a building material mixture containing at least one additive according to the invention and at least one binder. The binder is preferably selected from (portland) cement, slag sand, fly ash, silica dust, metakaolin, natural pozzolans, burnt oil shale, calcium aluminate cement and mixtures thereof. The building material mixture may further contain standard constituents such as hardening accelerators, hardening retardants, clay modifiers, shrinkage reducers, corrosion inhibitors, agents for increasing strength, water reducers, etc.

The dosage of additive according to the invention is generally 0.1% to 4% by weight in solid form, and based on the cement content of the building material mixture. The dosage can be effected in the form of an aqueous colloidally disperse preparation or of a dried solid, for example in the form of a powder.

EXAMPLES

Gel Permeation Chromatography

The sample preparation for the determination of molar mass was effected by dissolving polymer solution in the GPC buffer, such that the polymer concentration in the GPC buffer is 0.5% by weight. Thereafter, this solution was filtered through a syringe filter having a polyethersulphone membrane and pore size 0.45 μm. The injection volume of this filtrate was 50-100 μl.

The molecular weights were determined on a Waters Alliance 2690 GPC instrument with UV detector (Waters 2487) and RI detector (Waters 2410).
Columns: Shodex SB-G Guard Column for SB-800 HQ series
Shodex OHpak SB 804HQ and 802.5HQ
(PHM gel, 8×300 mm, pH 4.0 to 7.5)
Eluent: 0.05 M aqueous ammonium formate/methanol mixture=80:20 (parts by volume)
Flow rate: 0.5 ml/min
Temperature: 50° C.
Injection: 50 to 100 μl
Detection: RI and UV The molecular weights of the polymers were determined relative to polyethylene glycol standards from PSS Polymer Standards Service GmbH. The molecular weight distribution curves of the polyethylene glycol standards were determined by means of light scattering. The masses of the polyethylene glycol standards were 682 000, 164 000, 114 000, 57 100, 40 000, 26 100, 22 100, 12 300, 6240, 3120, 2010, 970, 430, 194, 106 g/mol.

Polymer Synthesis

The comb polymer P1 is based on the monomers maleic acid, acrylic acid and vinyloxybutyl polyethylene glycol—5800. The molar ratio of acrylic acid to maleic acid is 7. Mw=40 000 g/mol and was determined via GPC. The solids content is 45% by weight. The synthesis is described, for example, in EP0894811. The charge density is 0.93 μeq/g.

Polymer P2

A 1 l jacketed reactor with thermometer, reflux condenser and a connection for second feeds was initially charged with 500 g of water, 350 g of vinyloxybutyl polyethylene glycol (VOBPEG 3000) (116.7 mmol), 0.01 g of $FeSO_4$, 1, 55 g of mercaptoethanol and 3.5 g of Brüggolit FF06 (sulphinic acid-based reducing agent; Briggemann KG).

Subsequently, 25.48 g of acrylic acid (99%, 350.0 mmol) and 1.8 g of 50% $H_2O_2$ were added. After 20 minutes, the polymer solution is neutralized with 69 g of 20% NaOH. The solids content is 41.0%. The molecular weight is 37 500 g/mol. The charge density is 0.897 μeq/g.

Illustrative Calculation of Charge Density:

$$\sum_j z_{S,j} \times n_{S,j} \text{ in mmol per gram polymer} =$$

$$\frac{n(\text{mol number of weight portion of acid monomers in mmol}) \cdot \text{charge of acid monomer}}{m(\text{mass of polymer solution in g}) \cdot \text{solids content of the polymer solution in \%}}$$

Example Calculation for Polymer P2 (for Starting Weights See Polymer Synthesis)

$$\sum_j z_{S,j} \times n_{S,j} = \frac{(350 \text{ mmol}) \cdot 1}{(951.3 \text{ g} \cdot 41.0\%/100)} = 0.897 \text{ mmol/g}$$

Illustrative calculation of formula (a) with reference to example A1:

The corresponding masses are taken from Table 2, Composition of the additives: Mass of polymer P1 7.4 g and mass of calcium nitrate 1.5 g.

Therefore:

$$n_K = 1.5 \text{ g}/164 \text{ g/mol} = 9.2 \text{ mmol},$$

$$n_S = 7.4 \text{ g} \cdot 0.93 \text{ mmol/g} = 6.88 \text{ mmol}$$

and $$\frac{\sum_i z_{K,i} \times n_{K,i}}{\sum_j z_{S,j} \times n_{S,j}} = \frac{9.2 \text{ mmol} \cdot 2}{6.88 \text{ mmol} \cdot 1} = 2.68$$

TABLE 1

| % Physical data of the polymers | | |
|---|---|---|
|  | P1 | P2 |
| $\Sigma_j z_{S,j} \times n_{S,j}$ in mmol per gram of polymer | 0.93 | 0.897 |

Examples for Preparation of the Additives According to the Invention

Phosphonate and phosphate compounds used as anion were derived from the following compounds:

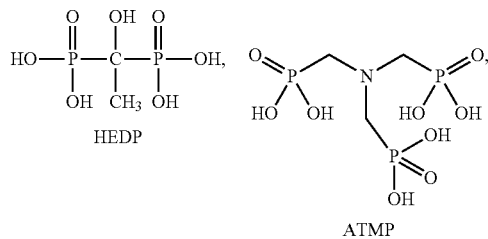

HEDP, ATMP tion, the anion compounds according to the invention or the anions for C1 and C2, and optionally a base or acid to adjust the pH. The mixing is conducted in a 1 l jacketed glass reactor with paddle stirrer at 300 rpm, at a controlled temperature of 20° C. The sequence of addition is stated in the table by a code of letters. P represents the aqueous solution of the comb polymer, K represents the metal cation salt according to the invention, A represents the anion compound according to the invention, and B and S respectively represent base and acid. A code of PKAB means, for example, that the polymer P is initially charged, then the metal cation salt A is added. This is followed by the addition of the anion compound A and the addition of the base B. The amounts are always based on the solids contents. The final pH of the resulting suspensions is likewise stated.

The Composition of the Additives is Compiled in Table 2 Below:

TABLE 2

Composition of additives A1-A9 and comparative additives C1 and C2

| Additive No. | Polymer | Metal salt | Anion comp. | Base/ acid | pH | Sequence | Water (% by wt.) | Polymer (% by wt.) | Metal salt (% by wt.) | Anion comp. (% by wt.) | Base/ acid (% by wt.) | $\sum_i z_{K,i} * n_{K,i}$ / $\sum_j z_{S,j} * n_{S,j}$ | $\sum_l z_{A,l} \times n_{A,l}$ / $\sum_j z_{K,i} \times n_{K,i}$ |
|---|---|---|---|---|---|---|---|---|---|---|---|---|---|
| A1 | P1 | Ca(NO$_3$)$_2$ | HEDP | NaOH | 12.4 | PKAB | 90.6 | 7.4 | 1.5 | 0.3 | 0.2 | 2.68 | 0.2 |
| A2 | P1 | Ca(NO$_3$)$_2$ | HEDP | NaOH | 12.5 | PKAB | 90.2 | 7.2 | 1.5 | 0.6 | 0.4 | 2.68 | 0.48 |
| A3 | P1 | Ca(NO$_3$)$_2$ | HEDP | NaOH | 12 | PBAK | 72.9 | 20.2 | 4.1 | 1.5 | 1.2 | 2.68 | 0.40 |
| A4 | P1 | Ca(NO$_3$)$_2$ | PEP | NaOH | 12.5 | PKAB | 72.3 | 20.1 | 4.1 | 1.8 | 1.7 | 2.68 | 0.33 |
| A5 | P1 | Fe(NO$_3$)$_3$ × 9H$_2$O | HEMPA | NH$_4$OH | 6 | PKAB | 69.4 | 20.8 | 7.8 | 1.0 | 1.1 | 3.00 | 0.27 |
| A6 | P1 | Fe(NO$_3$)$_3$ × 9H$_2$O | ATMP | NH$_4$OH | 6 | PKAB | 69.5 | 20.7 | 7.8 | 0.9 | 1.2 | 3.0 | 0.40 |
| A7 | P1 | Ba(OH)$_2$ | HEDP | HNO$_3$ | 12.5 | PKAS | 70.4 | 20.8 | 4.4 | 1.6 | 2.8 | 2.68 | 0.4 |
| A8 | P1 | Ba(OH)$_2$ | ATMP | HNO$_3$ | 12.5 | PKAS | 70.3 | 22.2 | 4.8 | 1.3 | 1.4 | 2.68 | 0.6 |
| A9 | P2 | Ca(NO$_3$)$_2$ | HEDP | NaOH | 12.5 | PKAB | 71.7 | 22.7 | 3.2 | 1.7 | 0.7 | 2.0 | 0.6 |
| C1 | P1 | Ca(NO$_3$)$_2$ | H$_3$PO$_4$ | NaOH | 11 | PKAB | 72.5 | 21.0 | 4.3 | 0.9 | 1.3 | 2.68 | 0.52 |
| C2 | P2 | Ca(NO$_3$)$_2$ | NaAlO$_2$ | NaOH | 10 | PAKB | 72.9 | 23.0 | 3.2 | 0.5 | 0.4 | 2.00 | 0.15 |

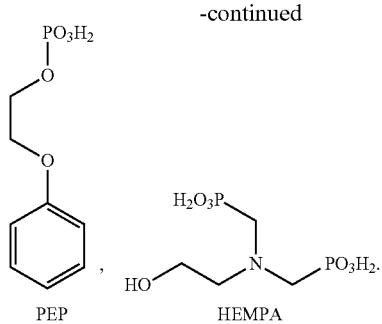

PEP, HEMPA

Preparation of Additives A1 to A9 and Comparative Additives C1 and C2:

The aqueous solutions of the comb polymers are mixed by stirring with the metal cation salts according to the inven- Preparation of the Inventive Additive A10 and Comparative Additives C3 and C4:

Additive A2 was mixed with a calcium silicate hydrate suspension (C—S—H or CSH) in a solids ratio of 1:1. A pH of 11.9 was established.

The preparation of the calcium silicate hydrate suspension is described in WO2010/026155A1 (accelerator example 5, table on page 40).

Additives C3 and C4 serve as comparative examples for additives according to WO 2014/013077 in a mixture with C—S—H (prepared according to WO 2010/026155). Additive C3 is additive C1 additionally containing CSH in a solids ratio of 1:1. In the case of C3, a pH of 11.4 was established. Additive C4 is additive C2 additionally containing CSH in a solids ratio of 1:1. In the case of C4, a pH of 11.6 was established.

Preparation of the Inventive Additive A11:

Additive A4 was mixed with the same calcium silicate hydrate suspension (prepared according to WO 2010/026155) as in A10 in a solids ratio of 1:1. A pH of 12 was established.

Application Tests

Mortar Tests

The mortar tests used were standard mortar tests according to DIN EN 1015-3 with Bernburg CEM I 42.5 R (w/c 0.42). The weight ratio of sand to cement was 2.2 to 1. A mixture of 70% by weight of standard sand (Normensand GmbH, D-59247 Beckum) and 30% by weight of quartz sand was used. Before the testing in a mortar, the additive samples were defoamed with 1% by weight of triisobutyl phosphate, based on the additive solids content.

Mixing Operation

Cement was introduced into the initial charge of water. This defines the time 0 s. This was followed by stirring at level 1 for 30 s. Then the sand was added and the mixture was stirred at level 1 (140 rpm) for a further 30 s and at level 2 (285 rpm) for a further 30 s. Then the stirring was stopped for 90 s. Within this time interval, the additive was added as an aqueous preparation. The water added with the additive here was subtracted correspondingly from the amount of mixing water. Finally, the mixture was stirred at level 2 for another 60 s. After the total mixing time, which was thus 4 minutes, the first slump was determined.

The slump was determined by shaking the flow table, according to the above-mentioned DIN method, by raising and dropping (knocking) it 15 times. The diameter of the mortar cake after the knocking is referred to as the slump. Delta refers to the difference in the slump for the additive in question after 30 min compared to the slump after 4 min.

The mortar mixtures produced are used to make prisms to determine flexural and compressive strength according to DIN EN 196-1.

The dosages stated are based on the solids content of the additives used.

The results for additives A1 to A9 and comparative additives C1 and C2 are compiled in Table 3, and the results for additives A10 and A11 and comparative additives C3 and C4 in Table 4.

TABLE 3

Mortar results, Bernburg cement, w/c 0.42

| Additive no. | Dosage (%) | Slump (cm) 4 min | 10 | 30 | 60 | 90 | Delta (cm) (30 min − 4) |
|---|---|---|---|---|---|---|---|
| P1 | 0.105 | 25.4 | 20.5 | 18.2 | | | −7.2 |
| P2 | 0.11 | 23.0 | 21.1 | 19.1 | | | −3.9 |
| A1 | 0.25 | 24.9 | 26.1 | 28.5 | 28.7 | 26.7 | +3.6 |
| A2 | 0.23 | 21.9 | 23.4 | 25.4 | 25.7 | 25.7 | +3.5 |
| A3 | 0.3 | 25.5 | 24.5 | 24.5 | 24.8 | 24.0 | −1.0 |
| A4 | 0.3 | 20.8 | 21.0 | 22.1 | 22.6 | 22.0 | +1.3 |
| A5 | 0.2 | 24.9 | 25.2 | 24.3 | 23.7 | 22.1 | −0.6 |
| A6 | 0.2 | 24.7 | 25.2 | 24.8 | 23.7 | 22.0 | +0.1 |
| A7 | 0.22 | 29.6 | 28.6 | 27.8 | 26.9 | 24.8 | −1.8 |
| A8 | 0.17 | 28.2 | 27.3 | 25.3 | 22.9 | 20.6 | −2.9 |
| A9 | 0.19 | 23.5 | 23.4 | 23.6 | 23.4 | 22.6 | +0.1 |
| C1 | 0.22 | 24.5 | 26.4 | 26.7 | 25.8 | 25.5 | +2.2 |
| C2 | 0.22 | 21.2 | 22.6 | 23.8 | 23.6 | 23.7 | +2.6 |

TABLE 4

| Additive no. | Dosage (%) | Slump (cm) 4 min | 10 min | 30 min | 60 min | 90 min | 120 min | Delta (30 min) | Strength after 12 h Flexural strength (MPa) | Compressive strength (MPa) |
|---|---|---|---|---|---|---|---|---|---|---|
| A10 | 0.40 | 24.5 | 24.9 | 24.2 | 23.1 | 21.7 | 20.1 | −0.3 | 2.044 | 7.228 |
| A11 | 0.40 | 25.5 | 25.2 | 22.6 | 20.9 | 19.5 | | −2.9 | 2.210 | 8.528 |
| C3 | 0.60 | 20.9 | 21.7 | 22.2 | 21.5 | 19.7 | 17.2 | +1.3 | 2.051 | 6.825 |
| C4 | 0.40 | 25.7 | 25.3 | 23.7 | 23.6 | 22.1 | 20.6 | −2.0 | 1.613 | 5.278 |

As the mortar results show, the additives according to the invention have excellent retention of consistency. In addition, the early strength of the additives according to the invention is improved; see the 12 h strength for the inventive additives A10 and A11.

In a further experiment, additives A12 and A13 as well as C5 were prepared using the components given above for additives A2, A4 and C1 but without addition of calcium silicate hydrate. Mortar mixtures were prepared as described above which were used for the preparation of prisms for determining the compressive strength after 7d in accordance with DIN EN 196-1. The results are given in table 5 below.

TABLE 5

| Additive Nr. | Dosage (%) bwoc | CS (MPa) | Slump (cm) 5 min | 10 min | 30 min | 60 min | 90 min |
|---|---|---|---|---|---|---|---|
| A12 | 0.12 | 47.9 | 25 | 25.1 | 24.2 | 23.8 | 23.9 |
| A13 | 0.14 | 50.0 | 25.3 | 25.8 | 26.1 | 25.5 | 25.8 |
| C5 | 0.12 | 32.6 | 21.7 | 22.6 | 23.8 | 25.1 | 26 |

CS = compressive strength
bwoc = by weight of cement

As can be seen, the additives A12 and A13 of the invention provide, as compared to additive C5, for an increased slump retention combined with an increased compressive strength after 7d. Thus, the additives of the invention have the advantage that the mortar remains workable for a longer period of time and that the formwork can already be removed after 7 days so that the construction can be continued at an early time.

The invention claimed is:

1. An additive for hydraulically setting compositions, comprising an aqueous colloidally disperse preparation comprising
   a) at least one salt of at least one polyvalent metal cation with at least one organic phosphonate and/or organic phosphate compound as anion, optionally in a mixture with at least one compound capable of releasing an inorganic anion selected from carbonate, oxalate, silicate, phosphate, polyphosphate, phosphite, borate, aluminate and sulphate, which forms a sparingly soluble salt with the polyvalent metal cation and
b) at least one polymeric dispersant comprising anionic and/or anionogenic groups and polyether side chains, wherein the polyvalent metal cation selected from $Al^{3+}$, $Fe^{3+}$, $Fe^{2+}$, $Zn^{2+}$, $Mn^{2+}$, $Cu^{2+}$, $Mg^{2+}$, $Ca^{2+}$, $Sr^{2+}$, $Ba^{2+}$ and mixtures thereof, and wherein the metal cation is present in an amount corresponding to the following formula (a):

$$0.1 < \frac{\sum_i z_{K,i} * n_{K,i}}{\sum_j z_{S,j} * n_{S,j}} < 50. \quad (a)$$

where
$z_{K,i}$ is the magnitude of the charge of the polyvalent metal cation,
$n_{K,i}$ is the number of moles of the polyvalent metal cation,
$z_{S,j}$ is the magnitude of the charge of the anionic and anionogenic group present in the polymeric dispersant,
$n_{S,j}$ is the number of moles of the anionic and anionogenic group present in the polymeric dispersant,
the indices i and j are independent of one another and are an integer greater than 0, where i is the number of different kinds of polyvalent metal cations and j is the number of different kinds of anionic and anionogenic groups present in the polymeric dispersant.

2. The additive according to claim 1, wherein the organic phosphonate or organic phosphate compound is capable of forming a sparingly soluble salt with at least one of the polyvalent metal cations.

3. The additive according to claim 1, wherein at least one polyvalent metal cation and at least one anion are present in an amount which is calculated by the following formulae:

$$0.1 < \frac{\sum_i z_{K,i} * n_{K,i}}{\sum_j z_{S,j} * n_{S,j}} < 50 \quad (a)$$

$$0 < \frac{\sum_l z_{A,l} * n_{A,l}}{\sum_l z_{K,i} * n_{K,i}} < 3 \quad (b)$$

where
$z_{K,i}$ is the magnitude of the charge of the polyvalent metal cation,
$n_{K,i}$ is the number of moles of the polyvalent metal cation,
$z_{S,j}$ is the charge of the anionic and anionogenic groups present in the polymeric dispersant,
$n_{S,j}$ is the number of moles of the anionic and anionogenic groups present in the polymeric dispersant,
$z_{A,l}$ is the charge of the anion,
$n_{A,l}$ is the number of moles of the anion,
the indices i and j are independent of one another and are an integer greater than 0, i is the number of different kinds of polyvalent metal cations and j is the number of different kinds of anionic and anionogenic groups present in the polymeric dispersant, I is the number of different kinds of anions which can form a sparingly soluble salt with the metal cation.

4. The additive according to claim 1, wherein the salt comprises an anion is selected from an anion of organic phosphonates or organic phosphates having 1 to 3 phosphonic acid and/or 1 to 3 phosphoric acid groups, wherein in the phosphonates the organic radical is attached to the phosphorus atom and in the phosphates the organic radical is attached to one or two oxygen atoms of the phosphate group, wherein the organic radical is selected from a $C_1$-$C_{12}$-alkyl radical which may optionally be interrupted by a nitrogen and/or oxygen atom, $C_2$-$C_4$-alkenyl radical or a poly($C_2$-$C_4$-alkoxy) radical having 2 to 300 alkoxy units.

5. The additive according to claim 1, wherein the anion is derived from an organic phosphonic acid or organic phosphoric acid of formula I

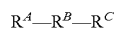

wherein
$R^A$ is H, hydroxy, $C_1$-$C_4$-alkoxy, $C_1$-$C_4$-alkyl, phenyl, —$PO_3H_2$ or —$OPO_3H_2$;
$R^B$ is $C_1$-$C_4$-alkylene, which is optionally substituted with hydroxy, $C_2$-$C_4$-Alkenylene, —$(CH_2)_x$—$NR^D$—$(CH_2)$, or —$(OC_zH_z)_n$—;
$R^C$ is —$PO_3H_2$ or —$OPO_3H_2$;
$R^D$ is —$(CH_2)_x$—$R^C$, hydroxy-$C_1$-$C_4$-alkyl or $R^E$—$(OC_zH_z)_n$—;
$R^E$ is H or $C_1$-$C_4$-alkyl;
x is 1 or 2;
y is 1 or 2;
z is 1, 2, 3 or 4; and
n is 1 to 100; and
mixtures thereof.

6. The additive according to claim 5, wherein the anion is derived from an organic phosphonic acid or organic phosphoric acid of formula I, wherein
$R^A$ is phenyl, —$PO_3H_2$ or —$OPO_3H_2$;
$R^B$ is $C_1$-$C_4$-alkylene, which is optionally substituted with hydroxy, or —$(OC_zH_z)_n$—;
$R^C$ is —$PO_3H_2$ or —$OPO_3H_2$;
z is 2 or 3; and
n is 1 to 100; and
mixtures thereof.

7. The additive according to claim 1, wherein the organic phosphonate or phosphate is derived from a compound of the formula

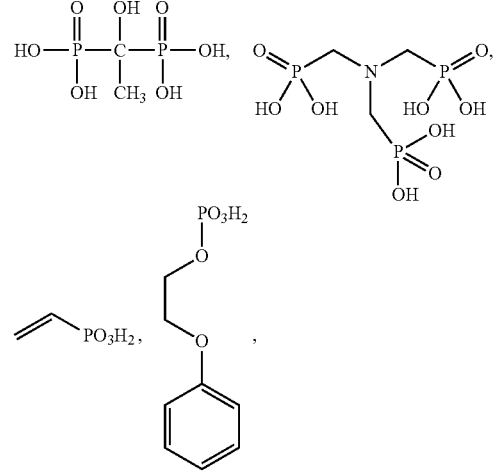

-continued

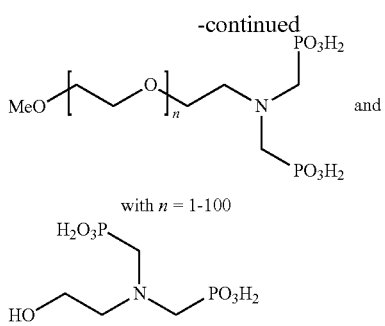

with $n$ = 1-100

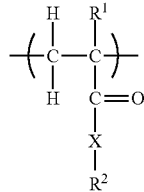

and mixtures thereof.

8. The additive according to claim 1, having a pH of 8 to 13.

9. The additive according to claim 1, wherein the polymeric dispersant has, as anionic or anionogenic group, at least one structural unit of the general formulae (Ia), (Ib), (Ic) and/or (Id):

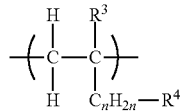 (Ia)

in which
$R^1$ is H or an unbranched or branched $C_1$-$C_4$-alkyl group, $CH_2COOH$ or $CH_2CO$—X—$R^2$;
X is NH—$(C_nH_{2n})$ or O—$(C_nH_{2n})$ with n=1, 2, 3 or 4, where the nitrogen atom or the oxygen atom is bonded to the CO group or is a chemical bond;
$R^2$ is OM, $PO_3M_2$ or O-$PO_3M_2$; with the proviso that X is a chemical bond when $R^2$ is OM;

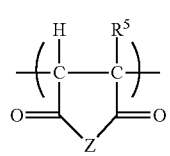 (Ib)

in which
$R^3$ is H or an unbranched or branched $C_1$-$C_4$-alkyl group;
n is 0, 1, 2, 3 or 4;
$R^4$ is $PO_3M_2$ or O-$PO_3M_2$;

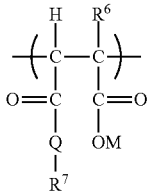 (Ic)

in which
$R^5$ is H or an unbranched or branched $C_1$-$C_4$-alkyl group;
Z is O or $NR^7$;

$R^7$ is H, —$(C_nH_{2n})$—OH, —$(C_nH_{2n})$—$PO_3M_2$, —$(C_nH_{2n})$—$OPO_3M_2$, —$(C_6H_4)$—$PO_3M_2$ or —$(C_6H_4)$—$OPO_3M_2$, and
n is 1, 2, 3 or 4;

(Id)

in which
$R^6$ is H or an unbranched or branched $C_1$-$C_4$-alkyl group;
Q is $NR^7$ or O;
$R^7$ is H, —$(C_nH_{2n})$—OH, —$(C_nH_{2n})$—$PO_3M_2$, —$(C_nH_{2n})$—$OPO_3M_2$, —$(C_6H_4)$—$PO_3M_2$, or —$(C_6H_4)$—$OPO_3M_2$, n is 1, 2, 3 or 4; and
where each M is independently H or one cation equivalent.

10. The additive according to claim 1, wherein the polymeric dispersant has, as polyether side chain, at least one structural unit of the general formulae (IIa), (IIb), (IIc) and/or (IId):

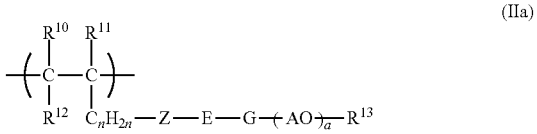 (IIa)

in which
$R^{10}$, $R^{11}$ and $R^{12}$ are each independently H or an unbranched or branched $C_1$-$C_4$-alkyl group;
Z is O or S;
E is an unbranched or branched $C_1$-$C_6$-alkylene group, a cyclohexylene group, $CH_2$-$C_6H_{10}$, 1,2-phenylene, 1,3-phenylene or 1,4-phenylene;
G is O, NH or CO—NH; or
E and G together are a chemical bond;
A is $C_xH_{2x}$ with x=2, 3, 4 or 5 or $CH_2CH(C_6H_5)$;
n is 0, 1, 2, 3, 4 and/or 5;
a is an integer from 2 to 350;
$R^{13}$ is H, an unbranched or branched $C_1$-$C_4$-alkyl group, CO—$NH_2$ and/or $COCH_3$;

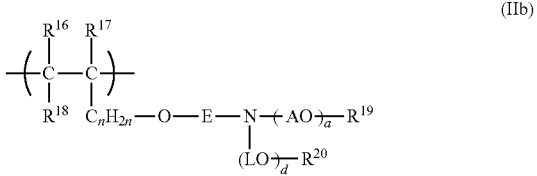 (IIb)

in which
$R^{16}$, $R^{17}$ and $R^{18}$ are each independently H or an unbranched or branched $C_1$-$C_4$-alkyl group;
E is an unbranched or branched $C_1$-$C_6$-alkylene group, a cyclohexylene group, $CH_2$-$C_6H_{10}$, 1,2-phenylene, 1,3-phenylene or 1,4-phenylene, or is a chemical bond;

A is $C_xH_{2x}$ with x=2, 3, 4 or 5 or $CH_2CH(C_6H_5)$;
n is 0, 1, 2, 3, 4 and/or 5;
L is $C_xH_{2x}$ with x=2, 3, 4 or 5 or $CH_2$—$CH(C_6H_5)$;
a is an integer from 2 to 350;
d is an integer from 1 to 350;
$R^{19}$ is H or an unbranched or branched $C_1$-$C_4$-alkyl group; and
$R^{20}$ is H or an unbranched $C_1$-$C_4$-alkyl group;

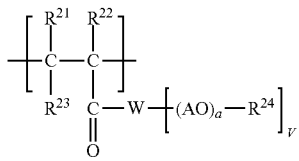
(IIc)

in which
$R^{21}$, $R^{22}$ and $R^{23}$ are each independently H or an unbranched or branched $C_1$-$C_4$-alkyl group;
W is O, $NR^{25}$ or N;
V is 1 when W=O or $NR^{25}$, and is 2 when W=N;
A is $C_xH_{2x}$ with x=2, 3, 4 or 5 or $CH_2CH(C_6H_5)$;
a is an integer from 2 to 350;
$R^{24}$ is H or an unbranched or branched $C_1$-$C_4$-alkyl group; and
$R^{25}$ is H or an unbranched or branched $C_1$-$C_4$-alkyl group;

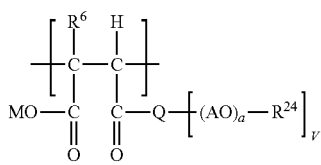
(IId)

in which
$R^6$ is H or an unbranched or branched $C_1$-$C_4$-alkyl group;
M is H or one cation equivalent;
Q is $NR^{10}$, N or O;
V is 1 when W=O or $NR^{10}$, and is 2 when W=N;
$R^{10}$ is H or an unbranched or branched $C_1$-$C_4$-alkyl group;
$R^{24}$ is H or an unbranched or branched $C_1$-$C_4$-alkyl group;
A is $C_xH_{2x}$ with x=2, 3, 4 or 5, or $CH_2C(C_6H_5)H$; and
a is an integer from 2 to 350.

11. The additive according to claim 1, wherein the polymeric dispersant is a polycondensation product comprising structural units (III) and (IV):

(III)

in which
T is a substituted or unsubstituted phenyl or substituted or unsubstituted naphthyl radical, wherein the phenyl or naphthyl is substituted by 1 or 2 $C_1$-$C_4$-alkyl or hydroxyl or 2 $C_1$-$C_4$-alkoxy groups, or a unsubstituted heteroaromatic radical having 5 to 10 ring atoms, of which 1 or 2 atoms are heteroatoms selected from N, O and S;

n is 1 or 2;
B is N, NH or O, with the proviso that n is 2 when B is N and the proviso that n is 1 when B is NH or O;
A is $C_xH_{2x}$ with x=2, 3, 4 or 5 or $CH_2CH(C_6H_5)$;
a is an integer from 1 to 300
$R^{25}$ is H, a branched or unbranched $C_1$- to $C_{10}$-alkyl radical, $C_5$- to $C_8$-cycloalkyl radical, aryl radical or heteroaryl radical having 5 to 10 ring atoms, of which 1 or 2 ring atoms are heteroatoms selected from N, O and S;
where the structural unit (IV) is selected from the structural units (IVa) and (IVb):

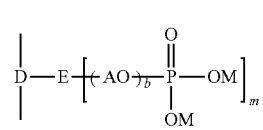
(IVa)

in which
D is a substituted or unsubstituted phenyl or substituted or unsubstituted naphthyl radical, wherein the phenyl or naphthyl is substituted by 1 or 2 $C_1$-$C_4$-alkyl or hydroxyl or 2 $C_1$-$C_4$-alkoxy groups, or a unsubstituted heteroaromatic radical having 5 to 10 ring atoms, of which 1 or 2 ring atoms are heteroatoms selected from N, O and S;
E is N, NH or 0, with the proviso that m is 2 when E is N and the proviso that m is 1 when E is NH or 0;
A is $CH_2H_{2x}$ with x=2, 3, 4 or 5 or $CH_2CH(C_6H_5)$;
b is an integer from 1 to 300;
M is independently H or one cation equivalent; and
m is 1 or 2;

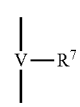
(IVb)

in which
V is a substituted or unsubstituted phenyl or substituted or unsubstituted naphthyl radical, wherein the substituted phenyl or naphthyl is substituted by one or two radicals selected from $R^8$, OH, $OR^8$, $(CO)R^8$, COOM, $COOR^8$, $SO_3R$ and $NO_2$;
$R^7$ is COOM, $OCH_2COOM$, $SO_3M$ or $OPO_3M_2$;
M is H or one cation equivalent; and
$R^8$ is $C_1$-$C_4$-alkyl, phenyl, naphthyl, phenyl-$C_1$-$C_4$-alkyl or $C_1$-$C_4$-alkylphenyl.

12. The additive according to claim 1, additionally comprising calcium silicate hydrate.

13. The additive according to claim 12, wherein the calcium silicate hydrate is obtained by reacting a water-soluble calcium source with a water-soluble silicate source in the presence of a polymeric dispersant.

14. The additive according to claim 1, wherein the additive is dried to form a solid, optionally in powder form.

15. A process for producing the additive for hydraulically setting compositions according to claim 1, wherein the salt of the polyvalent metal cation is precipitated with at least one organic phosphate or phosphonate compound as anion in the presence of the polymeric dispersant, in order to obtain an aqueous colloidally disperse preparation of the salt, or wherein a freshly precipitated salt of the polyvalent metal cation is dispersed in the presence of the polymeric dispersant in order to obtain an aqueous colloidally disperse formulation of the salt, and the aqueous colloidally disperse preparation obtained is optionally dried.

16. A method comprising adding the additive for hydraulically setting compositions according to claim 1 as a slump retainer or for improving early strength in water-containing building material mixtures comprising a hydraulic binder.

17. A building material mixture comprising an additive according to claim 1 and a binder selected from (portland) cement, slag sand, fly ash, silica dust, metakaolin, natural pozzolans, burnt oil shale and calcium aluminate cement and mixtures thereof.

18. The additive according to claim 1, having a pH of 11 to 13.

19. The additive according to claim 1, having a pH of >11.5 to 13.

* * * * *

UNITED STATES PATENT AND TRADEMARK OFFICE
CERTIFICATE OF CORRECTION

PATENT NO. : 11,377,392 B2
APPLICATION NO. : 15/735829
DATED : July 5, 2022
INVENTOR(S) : Torben Gädt et al.

It is certified that error appears in the above-identified patent and that said Letters Patent is hereby corrected as shown below:

In the Claims

Claim 3. Column 29, Lines 41-49 should recite:

$$0.1 < \frac{\sum_j z_{K,i} * n_{K,i}}{\sum_j z_{S,j} * n_{S,j}} < 50 \quad (a)$$

$$0 < \frac{\sum_l z_{A,l} * n_{A,l}}{\sum_l z_{K,i} * n_{K,i}} < 3 \quad (b)$$

Signed and Sealed this
Fourth Day of July, 2023

Katherine Kelly Vidal
*Director of the United States Patent and Trademark Office*